(12) United States Patent
Pepperell et al.

(10) Patent No.: US 9,684,946 B2
(45) Date of Patent: Jun. 20, 2017

(54) IMAGE MAKING

(71) Applicant: CARDIFF METROPOLITAN UNIVERSITY, Cardiff (GB)

(72) Inventors: Robert Christian Pepperell, Cardiff (GB); Alistair Henry Joel Burleigh, Cardiff (GB)

(73) Assignee: CARDIFF METROPOLITAN UNIVERSITY, Cardiff (GB)

( * ) Notice: Subject to any disclaimer, the term of this patent is extended or adjusted under 35 U.S.C. 154(b) by 0 days.

(21) Appl. No.: 14/763,454

(22) PCT Filed: Feb. 7, 2014

(86) PCT No.: PCT/GB2014/050375
§ 371 (c)(1),
(2) Date: Jul. 24, 2015

(87) PCT Pub. No.: WO2014/122477
PCT Pub. Date: Aug. 14, 2014

(65) Prior Publication Data
US 2015/0363905 A1    Dec. 17, 2015

(30) Foreign Application Priority Data
Feb. 7, 2013 (GB) .................................. 1302174.6

(51) Int. Cl.
*G06T 3/00*    (2006.01)
*G06T 3/40*    (2006.01)

(52) U.S. Cl.
CPC .............. *G06T 3/0037* (2013.01); *G06T 3/00* (2013.01); *G06T 3/40* (2013.01)

(58) Field of Classification Search
CPC ..................................................... G06T 3/0037
USPC ........................................................... 345/427
See application file for complete search history.

(56) References Cited

FOREIGN PATENT DOCUMENTS

| EP | 1953698 | 8/2008 |
|---|---|---|
| EP | 2362641 | 8/2011 |

OTHER PUBLICATIONS

Raskar, Ramesh, "The Office of the Future: A Unified Approach to Image-Based Modeling and Spatially Immersive Displays", SIGGPRAH 98, Orlando, Florida, Jul. 19-24, 1998, pp. 1-10.*
WIPO, International Search Report for PCT/GB2014/050375, Aug. 8, 2014.

* cited by examiner

Primary Examiner — Thomas Lett
(74) Attorney, Agent, or Firm — Hodgson Russ LLP

(57) ABSTRACT

A method of making an image of a scene (including a scene made by the method) generally corresponding to that perceived by the human brain via the human eyes, the method including the steps, in any suitable order, of: capturing, recording, generating, or otherwise representing a scene consisting of the entire field of view, or part thereof, visible to a human observer from a given 'Viewing Point' (VP) when fixating on a given region within the scene, progressively enlarging the image towards the area of the scene, and progressively compressing the area of the scene corresponding to the peripheral field of vision to thereby produce a modified image of the scene generally corresponding to how the scene would appear to the human perceiver.

14 Claims, 43 Drawing Sheets

1.

2.

1.

2.

1.

2.

1.

2.

1. Source image

2. Virtual or physical 3D depth map based on contours in source image

3. Source image mapped, printed or projected onto virtual or physical 3D depth map 4. Final image displayed on depth modified surface Mobile Bulge Based on Fixation Point / RA Position in FOVI

IMAGE MAKING

BACKGROUND TO THE INVENTION

Conventional image creation technologies, such as those using still or moving picture cameras or computer animations, are generally inadequate for capturing and representing the full scope and nature of the human visual experience. The reasons are many and include the fact that the image is usually based on the geometry of linear perspective, which projects 3-dimensional space on a 2-dimensional plane in a way that does not appear natural to a human viewer. Artists have known since the time of Leonardo da Vinci that linear perspective produces excessive distortions when the peripheral areas of the visual field are projected onto a 2-dimensional surface. As a result, conventional linear perspective images tend to present a constricted view of the world that is cropped, usually in the form of a rectangle, and thereby excludes much of the full field of view, including the peripheral field. Such excluded matter includes portions of the body of the viewer or objects in close proximity to the viewer even though they are visible in natural vision. The resulting images are normally presented as flat objects, i.e. as printed on paper or displayed on a flat screen, which contradicts the spatial cues in the image and thereby reduces the sense of perceived depth. Objects of interest usually appear smaller in the created image than they appear in real life due to the method of projection used in linear perspective and the lack of regard given to the psychological effects of attention on perceived object size, which tends to enlarge objects of interest. Moreover, such created images generally do not record or represent other features of human vision that enhance our visual experience of space, such as binocular depth information from double vision, or 'physiological diplopia'. In addition, conventional imaging systems fail to record other features of human vision such as heightened edge contrast, relative indistinctness of objects in the peripheral and non-fixated parts of the visual field, the subjective curvature of perceived space, the gradual fading and darkening of vision at the extreme periphery, the change in apparent size of objects relative to fixation point, the image of the viewer's body as seen from the first person perspective, etc. The present invention combines all these effects to produce synthetic emulation of human vision.

One advantage of this concept as a means of representing the entire human visual field is that excessively wide image formats such as those produced by panoramas are avoided because the peripheral areas of the scene are diminished in size and emphasis, as they are in real human vision. Excessively distorted images such as those produced by fisheye lenses, which often diminish the size of the object of interest, or wide-angle lenses that expand the peripheral areas, are also avoided. The greater emphasis is instead placed on the part of the image corresponding to central vision, and most subject to viewer attention, causing it to appear larger, so mimicking the way the scene would be perceived by the human visual system.

A further advantage of this concept is that it gives that area of the image corresponding to the fixation point and the area of attention greater prominence and saliency than with a conventional linear perspective image. For applications such as advertising, this has the benefit of directing the viewer's gaze to the area or object in the image the advertiser wishes to emphasise.

A further advantage is that by applying the methods described herein the resulting images can appear to have a substantially enhanced illusion of depth compared to images produced by conventional linear perspective, or other methods, and can include within the image frame a much wider field of view without diminishing the relative size of the object of interest, or attention, in the scene.

As with other "foveated" imaging systems, there is also a potential to make data storage and transmission savings due to the increased compression and lower resolution of information in areas of the image corresponding to the periphery of the visual field.

A further advantage of the method set out in this invention is that the view of the body of the viewer will be presented from the first person perspective with perceptual accuracy, thus enhancing the effectiveness of images that use this method to convey the first person perspective.

There are a number of known solutions that address some of the foregoing problems. These include the use of wide-angle lenses, such as fisheye lenses, which capture a very large angle of view but with excessive optical distortion at the edges of the image. Although such distortion can be corrected via suitable software processing this is not a perfect solution because the resulting image still projects according to linear perspective and lacks many of the features associated with real human vision, as described herein.

Another technique is to stitch together multiple images to capture a very wide panoramic field of view, but with the disadvantage that there is a practical limit to the use of such very wide picture formats. Moreover, such panoramas also lack the geometric structure and other features associated with real human vision, as described herein.

Other imaging technologies such as Quicktime VR and Condition One (http://www.conditionone.com/) allow the viewer to scan a wide field of view by scrolling through a virtual space, seeing the scene from multiple angles as directed by the viewer, but these methods are still subject to some or other of the inadequacies noted above.

In some forms of computer animation such as are used for video game engines there have been attempts to emulate the viewers' point of view by including parts of the body of the person from that point of view, but these views are generally rendered according to conventional linear perspective, and are confined to a limited rectangular viewing area in the centre of the visual field being depicted. As a consequence they exclude parts of the body, such as the nose or shoulders, which can often be seen in natural vision. There have been some attempts in commercial imagery to emulate the relative indistinctness of the peripheral visual field by selectively blurring of the outer edges of the image, but such techniques still do not compensate for all of the other inadequacies noted above.

Some lens-based and computer-based systems capture a wide field of view while at the same time showing the area of interest at greater size or resolution, thus emulating certain properties of the peripheral and foveal areas of human vision. For example, foveated and wide-angle foveated lens systems are designed to improve data compression and enhance the central area of the image while capturing a wide field of view (e.g. WO 2008/077132). Such systems, however, generally rely on capturing a monoscopic 2-dimensional linear perspective view of the scene (via a camera and lens) and do not produce a projection of the 3-dimensional world corresponding to the geometric structure of the full field of view as seen by a human being, as specified in the present invention. Nor do they compensate for the effects of a moving fixation point within the image or changes in the locus or range of attention within the image. Wide-angle foveated images are typically circular in shape, rather than elliptical and they do not include other features of natural vision, such as double vision (deliberate blurring of the image before and behind the object in focus), changes in apparent size of objects due to changes in fixation at different depth planes, heightened edge contrast of the fixated object, and other methods identified in the present invention.

Other methods use arrangements of multiple cameras to capture both a wide field of view while focusing on more detail on an area within the represented visual field (e.g. US 2004/0061787). The images from the cameras are stitched together and warped to form a wide-angle foveated output image for viewing. Such systems also claim to avoid the excessive distortions associated with conventional linear perspective projections due to the curved array of the cameras. They also aim to provide higher levels of acuity at the area of the image corresponding to the human fovea. However, they fail to record or represent the geometric structure or features of human vision, such as modifications in the image due to changes in 3-dimensional depth, increased saliency of the area of attention (not just fixation), binocular disparity and peripheral indistinctness, etc.

Other methods for enhancing the area of the image corresponding to the foveal region of the eye include 'digital zooming' in which areas of an image being fixated upon are enlarged or enhanced relative to the areas corresponding to the periphery of the image (e.g. US 2009/0245600). Such methods, however, rely on capturing a 2-dimensional linear perspective image (via a camera and lens) and do not represent the entire 3-dimensional field of view according to geometric structure perceived in natural human vision. The images resulting from these methods are typically rectangular rather than elliptical in shape and do not represent the additional features of human vision such as double vision, subjective curvature in the visual field, the effects of local attention, etc.

Other methods of generating a foveated image (e.g. EP2362641, U.S. Pat. No. 7,965,314 and GB2400259) are also based on the geometry of linear perspective and lack the capacity to capture and represent key features of human vision.

It has been known for several centuries that viewing a flat picture through a peephole or aperture can enhance the illusion of depth. Screen viewing devices have been designed that enhance the 3-dimensional depth experience of the viewer by covering flat screens with frames that obscure part of the underlying screen (see WO 2010094269; U.S. Pat. No. 6,144,417). However, the shape of the aperture in the frame is generally rectangular, and not elliptical. Moreover, the use of elliptical frames as taught by the present invention is as integrated components of the presentation system, to be used in conjunction with the images and display supports specified in the invention, and not as stand-alone devices to be used with any other images.

Current forms of imaging 3-dimensional space tend to rely on the rules of linear perspective which are based on the behaviour of light and the optical properties of the devices used to capture it, such as lenses and sensitive plates. However, such rules of devices fail to account for a number of features of the human visual system that are known to affect how we perceive the world, such as the structure of the human eye, the consequences of seeing with two eyes, psychological effects of attention and memory, and so on. The present invention is derived from the realisation that there is a need for a process for making images that more closely approximate the actual experience of human vision than those produced by currently available imaging techniques.

According to a first aspect of the invention there is provided a method of making a 2-dimensional image of a 3-dimensional scene generally corresponding to that perceived by the human brain via the human eyes, the method including the steps, in any suitable order, of:

capturing, recording or generating image data representative of a 3-dimensional scene, or otherwise representing a 3-dimensional scene consisting of the entire field of view or part thereof, visible to a human observer from a given 'Viewing Point' (VP) when fixating on a given depth region within the 3-dimensional scene, such as the foveal field of vision of the human eye, or some other fixation point, processing the image data to progressively compress the depth region of the 3-dimensional scene, corresponding to a peripheral field of vision, relative to a fixation point within the depth region, to thereby produce modified data representative of a modified 2-dimensional image of the 3-dimensional scene, generally corresponding to how the 3-dimensional scene would appear to the human perceiver.

The invention also includes in a second aspect the steps, in any order, of selectively including in the image if required additional features that mimic natural human vision where appropriate, including double images, heightened contrast, non-rectangular image formats, selective indistinctness and peripheral indistinctness.

According to a third aspect of the invention there is provided a method of making an image in which the output image is displayed on a surface, or through a medium, that increases the perceived sense of depth in the image by using a support or screen which takes the form of a bulged and/or recessed support or screen, in which the location of the bulge or indentation coincides with the fixation point and region of attention being represented in the image and the outer edge of the image coincides with the boundary of the visual field being represented, the boundary being raised relative to the major plane of the display surface. Conveniently, an aperture or vignette of suitable size, shape, is suitably positioned in front of the planar or non-planar image, and through which the viewer may look at the final image and thereby experience a greater sense of depth.

According to a fourth aspect of the invention the user or viewer of the Field of Vision Image (FoVI) is able to modify its properties by using a suitable input or control device, such as a computer mouse, a touch sensitive screen, a head tracking or eye tracking system, a joystick or games console controller, or depth or motion tracking device, such that the FP and the RA in the FoVI corresponds to the point at which the viewer or user is fixating (FIG. 16). Moreover, the user or viewer may selectively be able to modify the physical shape of the surface containing the FoVI by setting the FP to different points in the FoVI. In one embodiment, the user is able to set the RA within the FoVI such that all the other properties of the image as specified herein, including apparent object size and position, rendering resolution, degree of focus, degree of doubling, etc. are modified relative to the updated FP and changes in the position of the viewer relative to the image. In another embodiment of the invention, the physical shape of display the surface on which the FoVI is presented, modified in response to the input generated by the viewer, such that the part of the surface that is either protruding (bulging) or indented (depressed), corresponding to the RA, coincides with the movement of the RA across the surface of the FoVI (FIG. 17).

The invention will now be described, by way of example only, with reference to the accompanying drawings in which:

FIG. 1 is a diagram of the visual space being represented, which extends between 180 and 200 degrees horizontally and between 130 and 150 degrees vertically, and showing the Viewing Position (VP) relative to the boundary of the field of view, the region of attention in the scene (RA) surrounding the Fixation Point (FP).

FIG. 2 show examples of Field of View Maps (FoVM) overlaid on the Field of View Data (FOVD) that has been captured in a variety of geometric projections. 2a illustrates the data as captured by a fisheye projection; 2b illustrates the data as captured by an equi-rectangular projection; 2c illustrates the data as captured by a cylindrical projection; 2d illustrates the data as captured by a rectilinear projection; and 2e illustrates the data as captured by a vedutismo projection. The dashed line represents the boundary of the FoVM, which coincides with the edge of the visual field being captured.

FIG. 3 defines the location of a fixation point (FP) and a region of attention (RA), marked by a bold circle, within the field of view map (FoVM).

FIG. 4a is a diagram of shape of the Field of View Image (FoVI), which is the data space used to create the final output image. FIG. 4b illustrates the geometric construction of the ellipse, shown in bold line.

FIG. 5 shows an Illustration of the general geometric structure of an image generated by conventional linear perspective methods compared to one generated by the invention. 5a schematically represents the distribution of visual data produced by a system based on 2-dimensional linear perspective, and 5b shows how, in schematic terms, an image generated by the invention would differ, with the FP located at the centre of the image and the RA being equivalent to the size of the central bulged region of 5b.

FIG. 8 are diagrams illustrating the process for plotting the fixation point and the region of attention from the data captured from the scene to the image processed according to the present invention.

FIG. 9 are diagrams illustrating the process of transforming the field of view as represented in the field of view map (FoVM) to the final view visible in the field of view image (FoVI). The image on the left shows the fixation point (FP) and region of attention (RA) as specified in the data captured from the original scene, represented by the bold disc, and the relative position of all the other discs in the scene. The image on the right shows the same scene but transformed according to the present invention. Each disc is numbered so that its corresponding size and position in the final image can be seen. FIGS. 9a to 9e show how the same scene would appear with a number of different fixation points.

FIG. 10 are diagrams representing the depiction of depth and binocular disparity in the field of view image. FIG. 10a(1) shows the same scene as in FIG. 9 but with an extra disc (numbered 38) located in line with the FP but closer distance to the VP. FIG. 10a(2) shows how the scene viewed in FIG. 10a(1) would be transformed in the field of view image. The dashed lines in FIG. 10a(2) represent the outline of the nose of the viewer that defines the boundaries of the visual field available to each separate eye. The area between the dashed lines represents the part of the visual field that can be seen with two eyes at the same time. FIGS. 10a and 10b show the transformation of the scene occurring when disc 38 is placed at one position with respect to the viewer, and FIGS. 10c and 10d show the transformation of the scene occurring when disc 38 is placed at a closer position to the viewer. L and R signify the view of the left and right eyes respectively.

Figure 11:
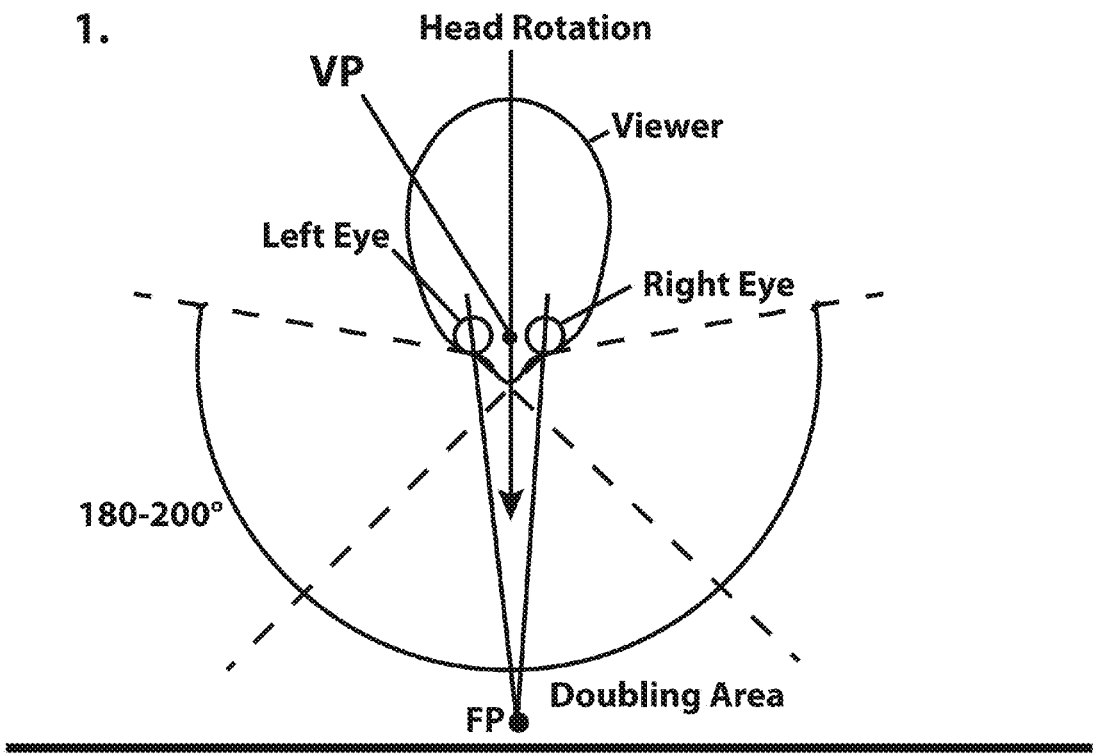
Figure 11:
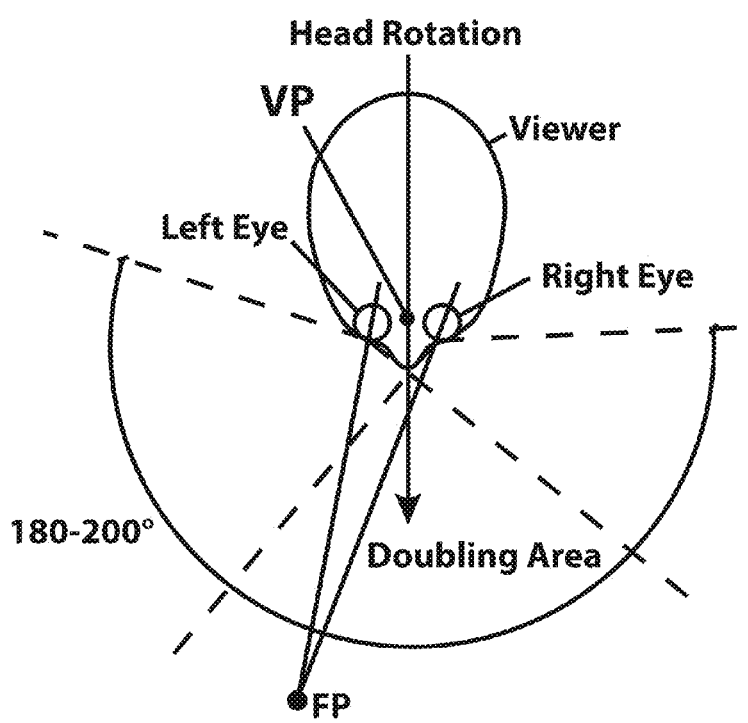

FIG. 11 are diagrams showing the overlap between the two eyes creating an area of binocular vision in the centre of the visual field in which double images appear.

FIG. 12 are diagrams showing the change in shape of the nose boundaries (represented by dashed lines) between a line of sight directly ahead of the viewer (12a) and one in which the viewer is looking to the right (12b).

Figure 13A:
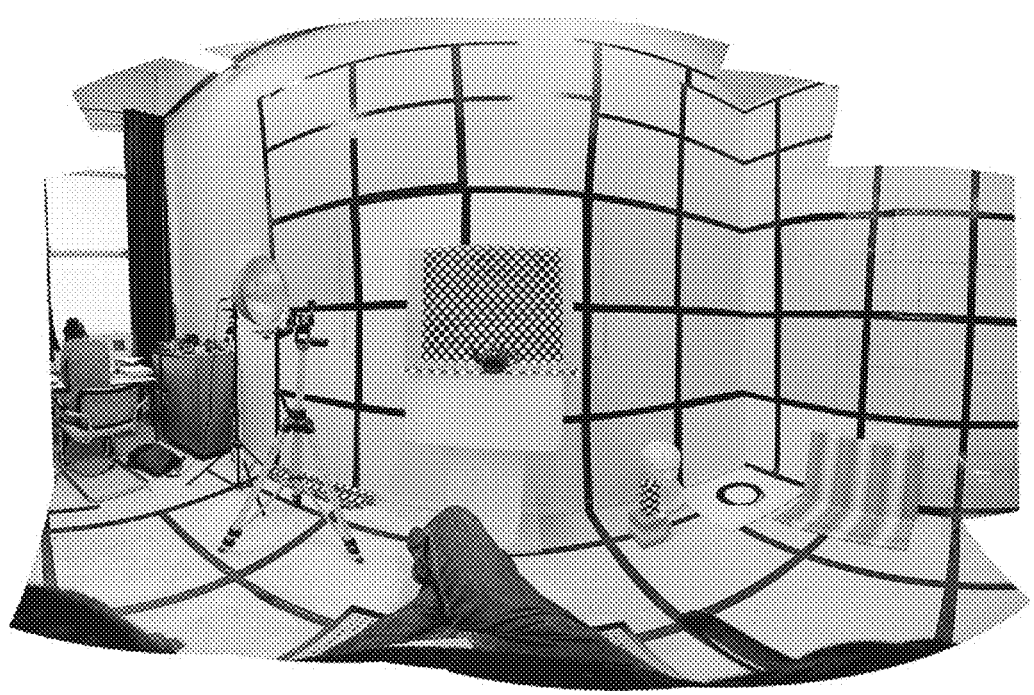
Figure 13B:
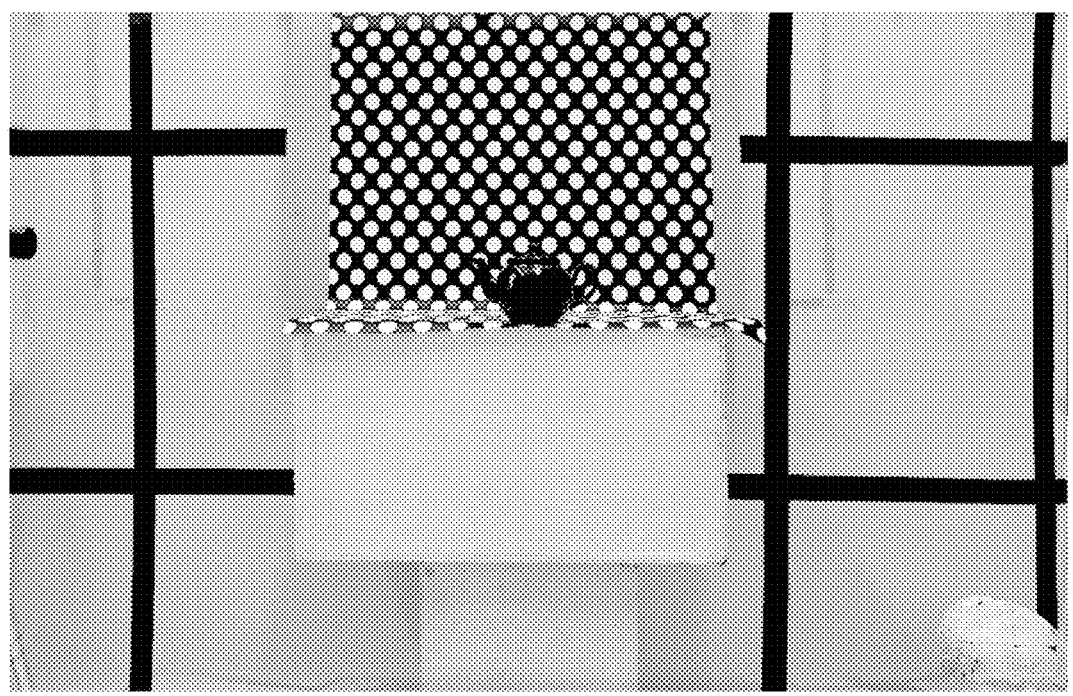
Figure 13C:
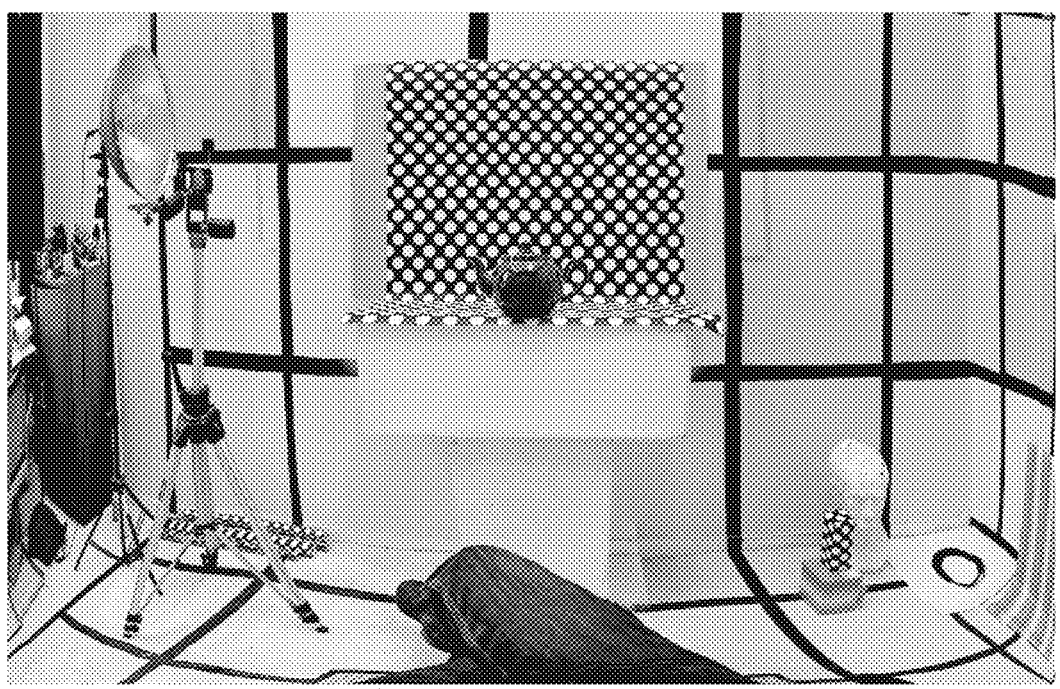
Figure 13D:
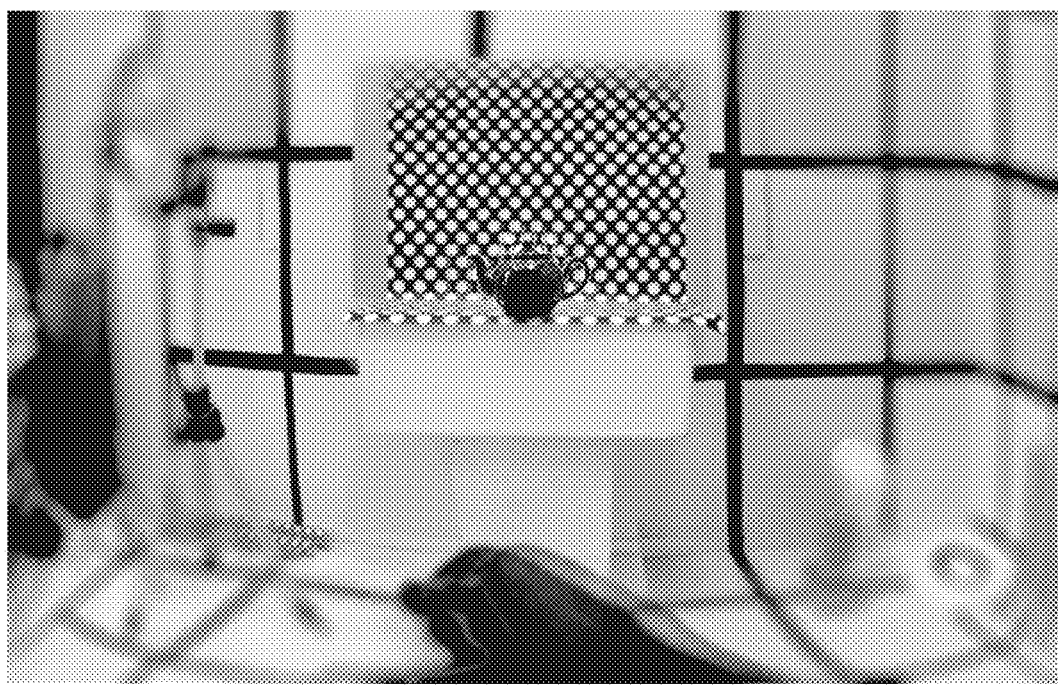
Figure 13E:
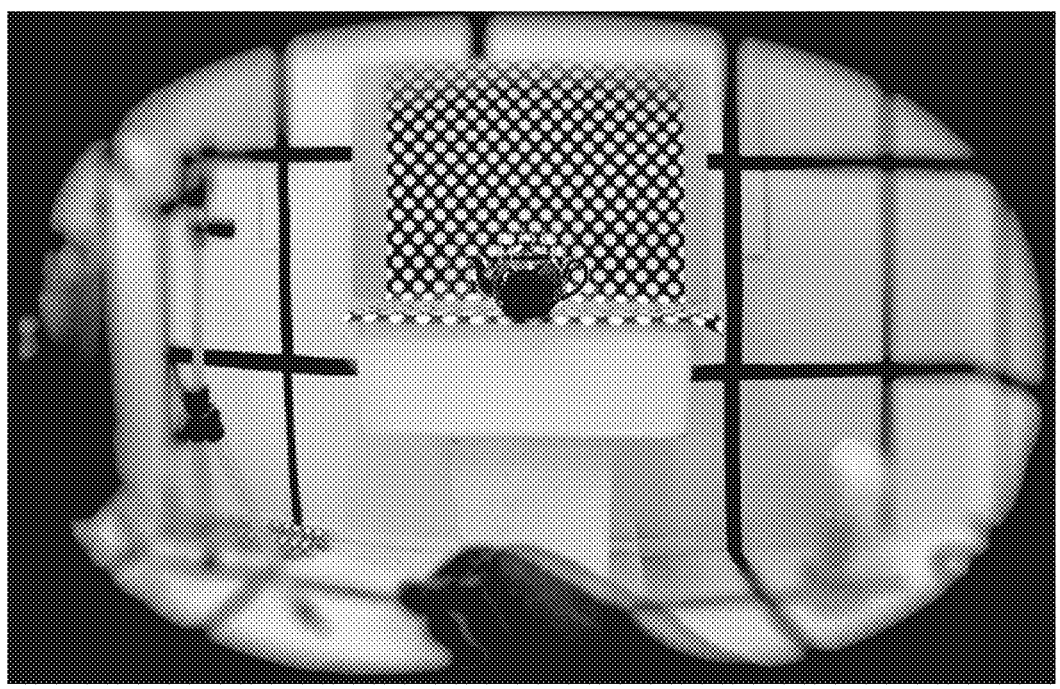

FIG. 13 by way of illustration only, shows in FIG. 13a the full field of view of a scene captured using multiple linear perspective shots stitched together, taken from the point of view of the person seated in the foreground. The point of fixation is the centre of the teapot on the stand and the region of attention is the whole of the teapot, and key depth measurements objects in the scene relative to the viewer are known. FIG. 13b shows the same view taken with a conventional single 24 mm lens and projected according to linear perspective. This depicts a much smaller area of the scene. FIG. 13c shows the same point of view but presented according to the geometric projection produced by the present invention. Note that the teapot in this figure is the same size as in FIG. 13b but more of the space of scene around the teapot is visible. FIG. 13d shows the same point of view but with additional effects added, as specified in the invention, including double vision behind and in front of the teapot, relative indistinctness of the areas around the teapot, heightened contrast of the teapot compared to the rest of the scene, and increased edge contrast around the teapot. FIG. 13e shows the same image as processed in FIG. 13d but with the addition of an elliptical frame or vignette that represents the boundary of the human visual field.

FIG. 14 are diagrams showing the shape of the non-planar screens or substrates used to present the final images. In FIG. 14a the fixation point and region of attention in the image corresponds to the location and size of the central bulge in the screen, while in 14b the depression in the screen coincides with the fixation point and region of attention in the image. 14c illustrates a process in which a 3-dimensional depth map is generated from the image and formed into a non-planar surface on which, or over which, the image is projected, printed or otherwise displayed.

Figure 15:
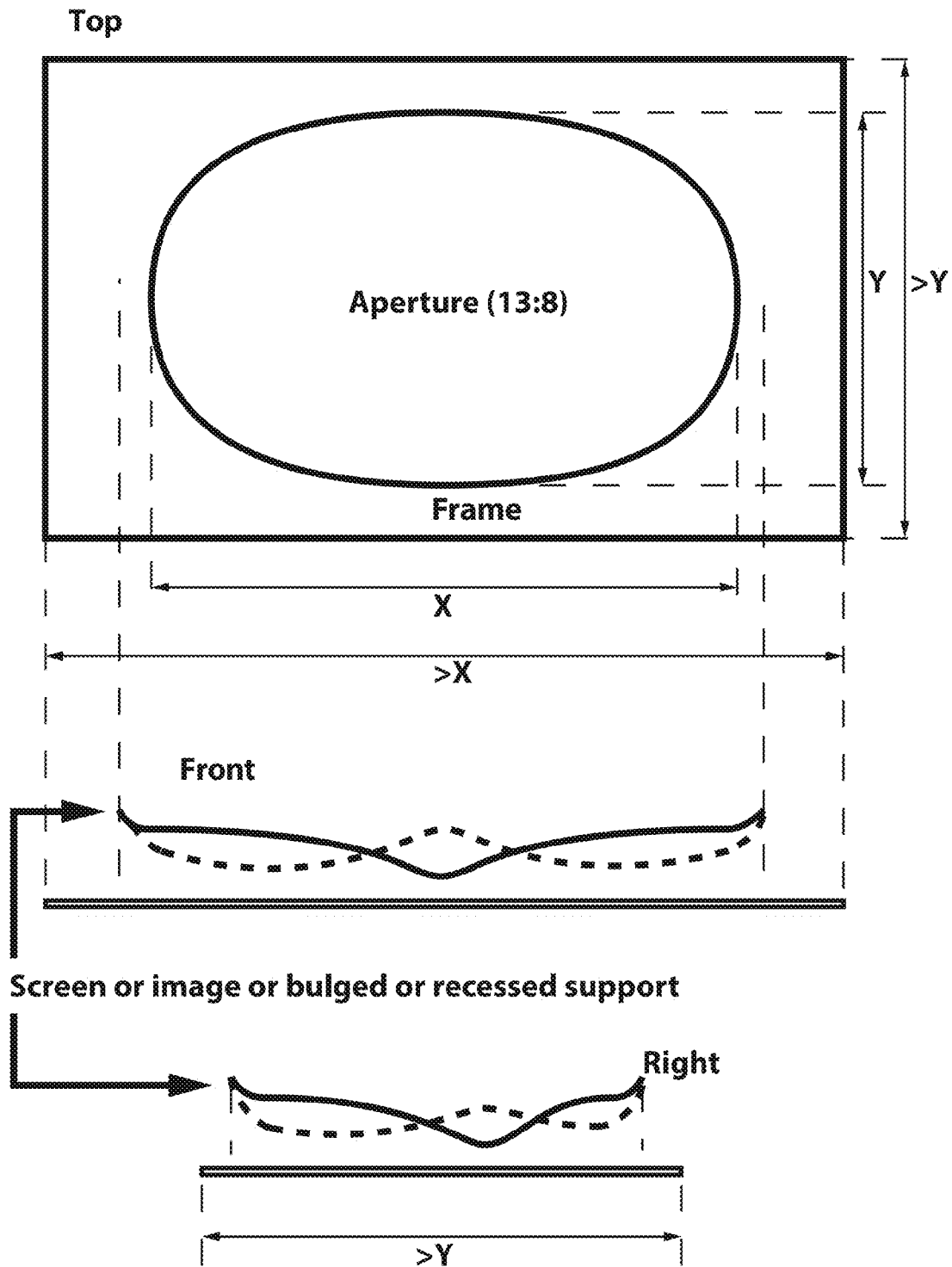

FIG. 15 is a diagram showing the elliptical aperture placed in front of the non-planar screen, or the final image through which the viewer sees the image.

Figure 16:
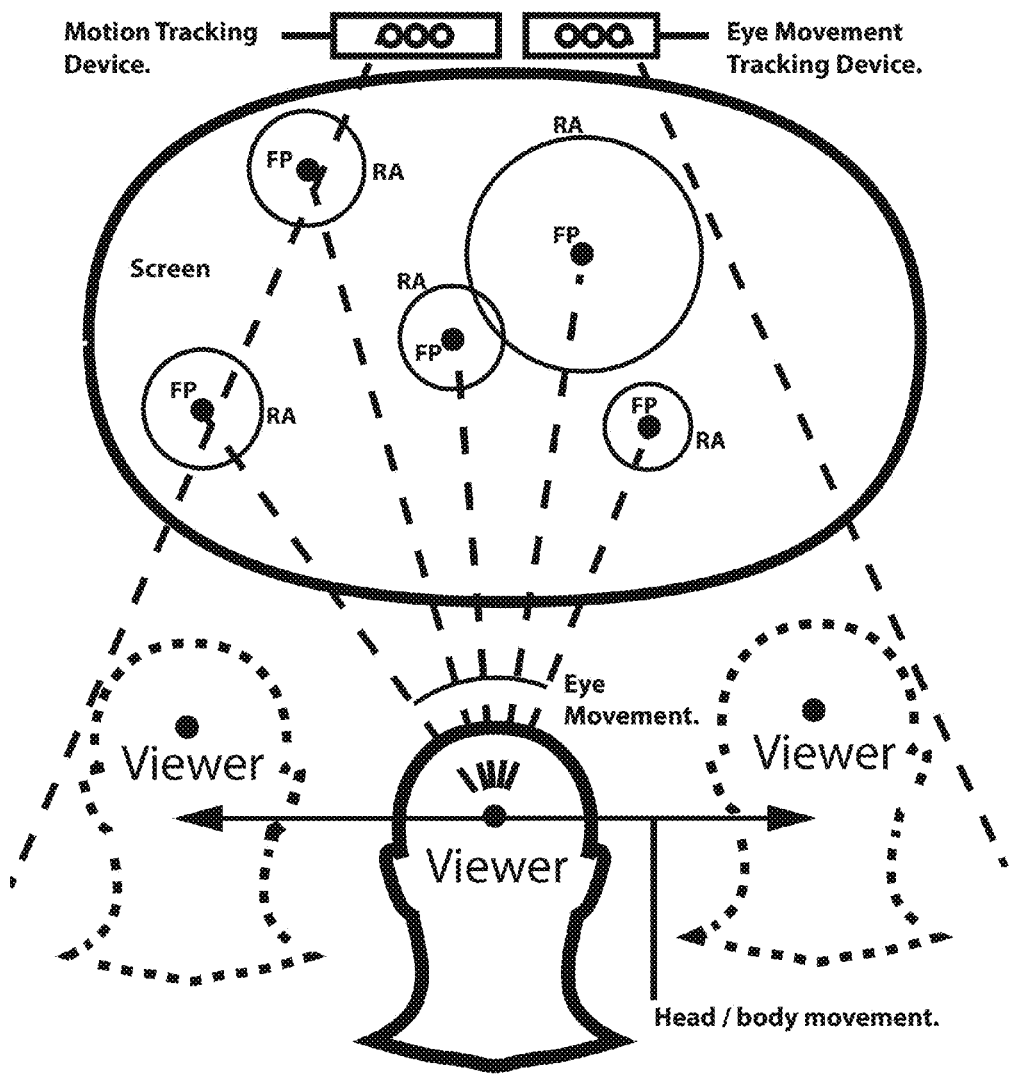

FIG. 16 is a diagram showing modifications being made to the properties of the final image in response to user input, interaction, or behaviour, with different fixation points (FP) and different sized regions of attention (RA).

Figure 17:
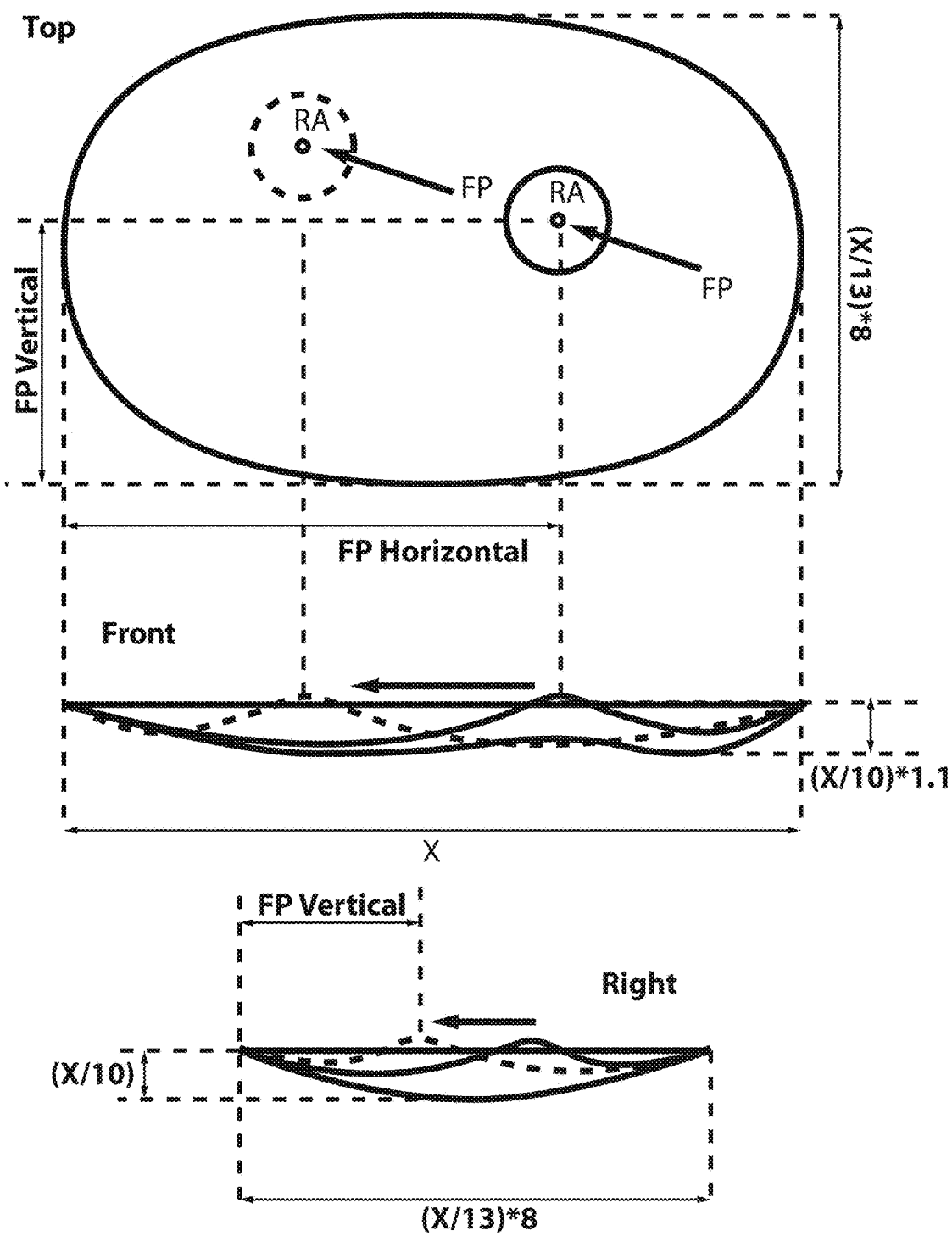

FIG. 17 are diagrams showing the movement of the bulge in the screen in response to user activated input, with two different fixation points (FP) and regions of attention (RA).

DETAILED DESCRIPTION OF THE DRAWINGS

Figure 1:
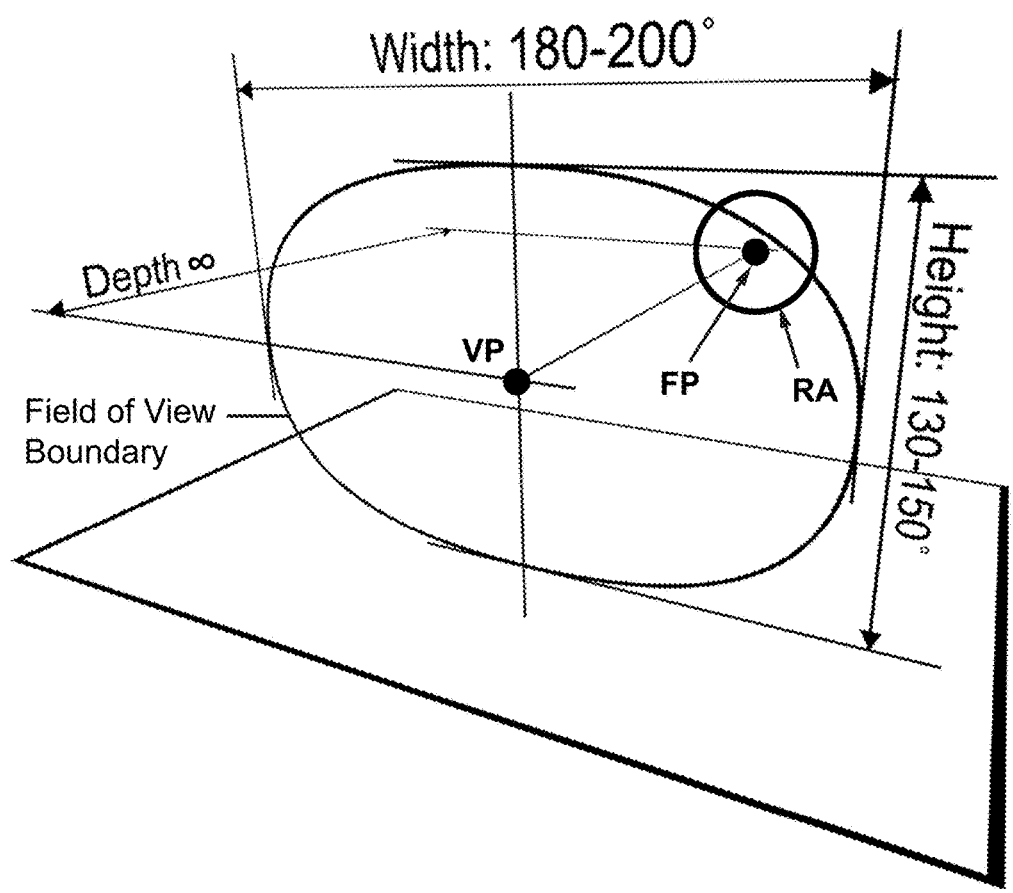

FIG. 1 is a graphical representation of what is visible to normal stereoscopic human vision, this comprising a field of view of between about 180-200 degrees horizontally and 130-150 degrees vertically, but normally about 180 degrees horizontally and 130 degrees vertically.

The 'Fixation Point' (FP) is defined herein as the point within the scene corresponding to where the eyes of a human observer, located at a given viewing point VP with respect to the scene, would be fixated (FIG. 1). RA is defined as 'Region of Attention', which corresponds to the object or area of the scene to which the viewer is attending in the scene. In general, the FP is normally located at the centre of the RA. The RA may vary in size and shape depending on how large the area or object of attention is in relation to the total area of the scene.

The capture, recording, generation or representation of the scene may be achieved by employing a number of processes, including but not limited to depth mapping, light field capturing, laser mapping, the use of suitably designed and arranged lenses and optically sensitive plates such as fisheye lens equipped cameras, single and stitched panoramic images, 360 degree camera systems, multiple camera arrangements, computer generated models, or other devices or processes that record the visual data in the area of a scene visible to an observer at the VP. The resulting representation of the scene, whether an image, a series of images, an array of recorded light, an array of spatial co-ordinates, or combination of these is referred to hereafter as the 'Field of View Data' or FoVD.

The FoVD includes, where necessary, a. information about the depth values of objects in the scene relative to the VP (these values may be recorded manually, optically, mechanically, or electronically, or calculated from information available in the FoVD), b. the location of the FP within the scene (which may be determined manually or automatically), c. the location of the outer edges of the visual field (which may be recorded manually, optically, mechanically, or electronically, or calculated from information available in the FoVD), and, if the FoVD is a flat image or images, d. the projection co-ordinate system used to project the 3-dimensional space onto the flat plane (which may be determined manually, optically, mechanically or electronically or calculated based on the properties of the system used to record the scene, e.g. the optics of the lens). The FoVD may also contain information concerning physical attributes of the viewer that might affect the appearance of the final image, such as the size and position of certain facial features like the nose, or the angle of the head with respect to the scene.

The scene may be captured, recorded, generated or represented in monoscopic form or in stereoscopic form to create the FoVD. If captured in monoscopic form, the data of the scene would correspond to the combined field of view available to both eyes simultaneously, i.e. between about 180-200 degrees horizontally and 130-150 degrees vertically. If captured in stereoscopic form, the data of the scene would comprise of two parts, each corresponding to the field of view available to the left and right eyes respectively, i.e. between about 140-160 degrees horizontally and 130-150 degrees vertically for each eye, and would combine to form a representation of the scene covering 180-200 degrees horizontally.

The scene may be captured, recorded, generated or represented in still or moving form to create the FoVD. If captured in still form it will consist of a static data set containing the full field of visual information available to a normal human observer at the VP relative to a given fixation region. If captured in moving form it will consist in an animated sequence of images and data representing the scene.

Figure 2A:
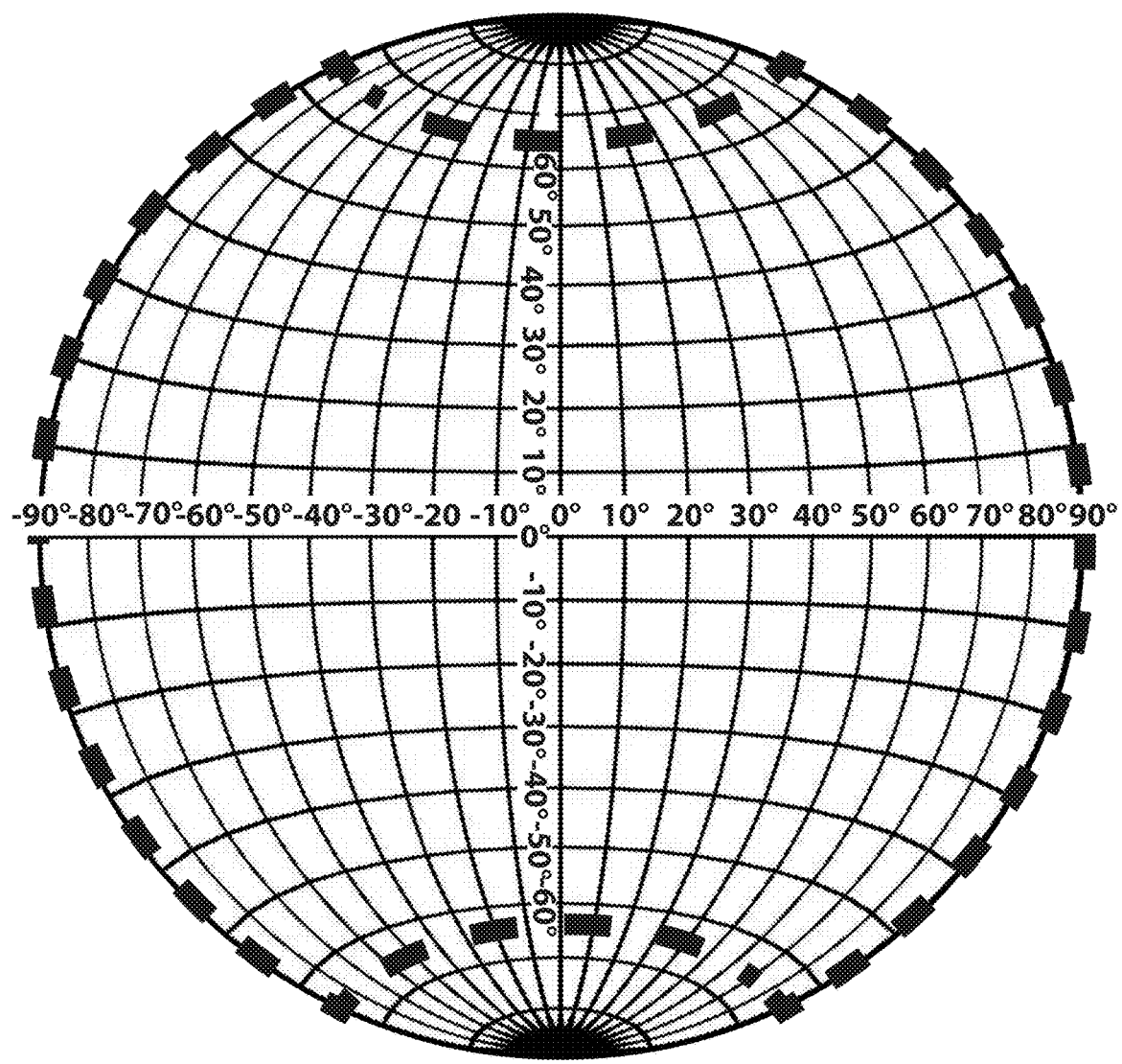
Figure 2B:
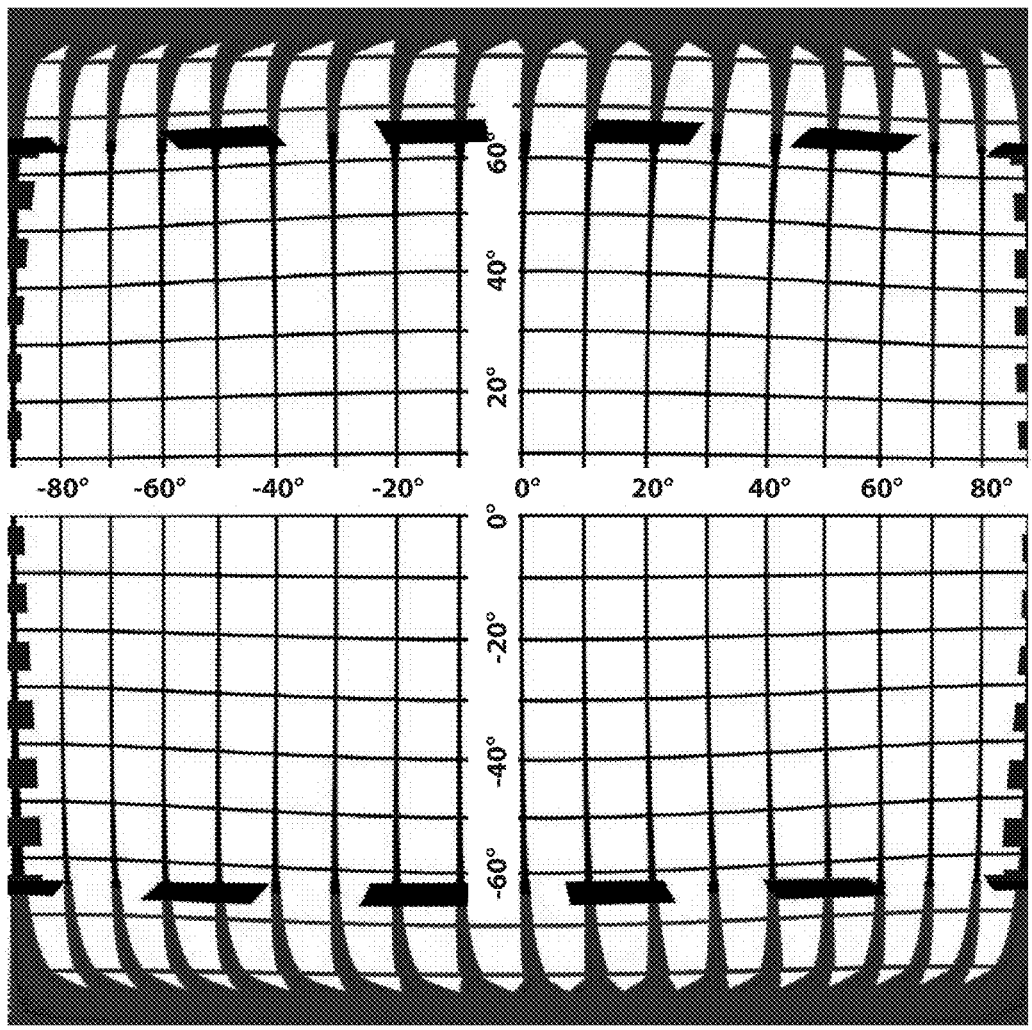
Figure 2C:
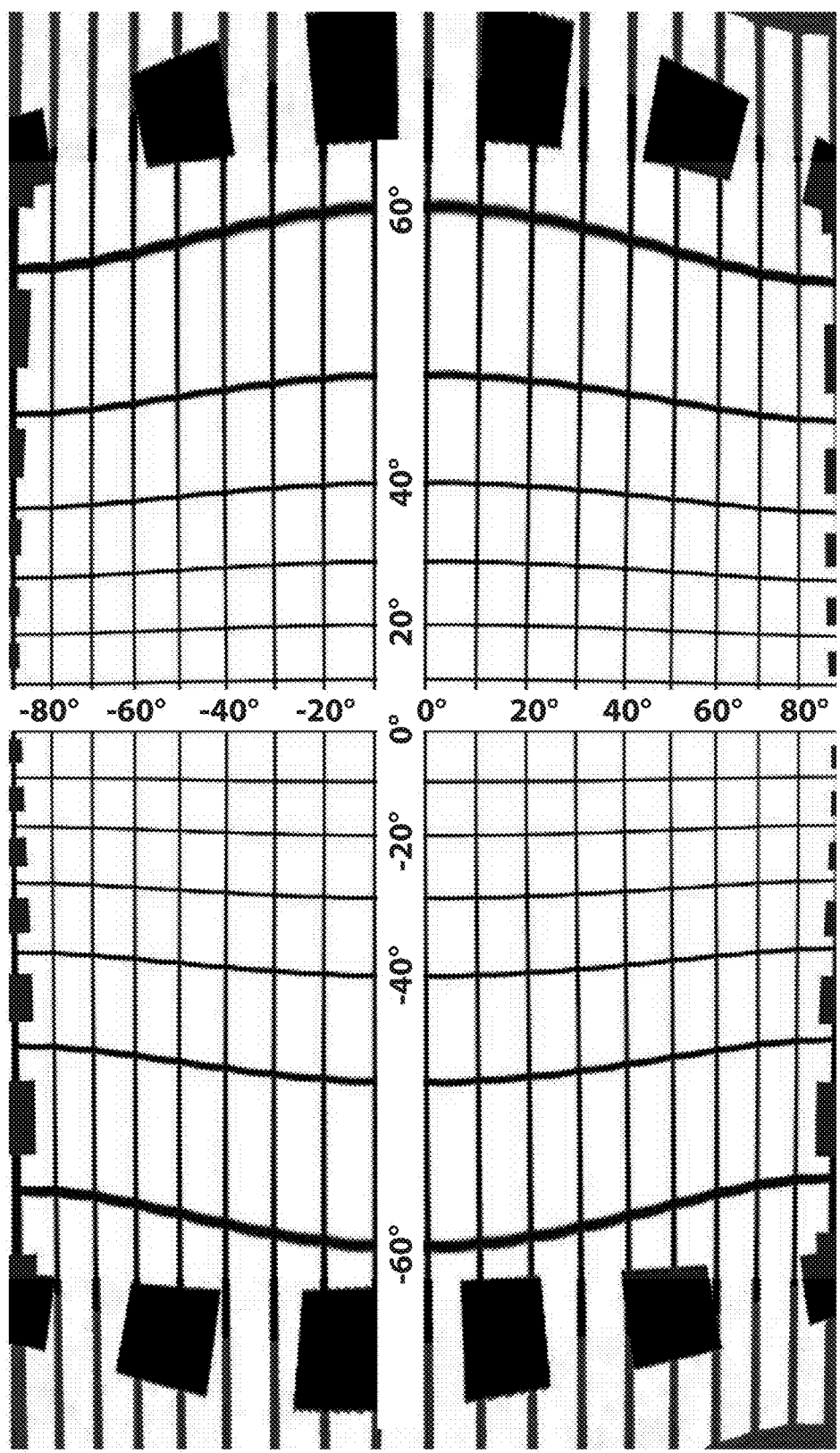
Figure 2D:
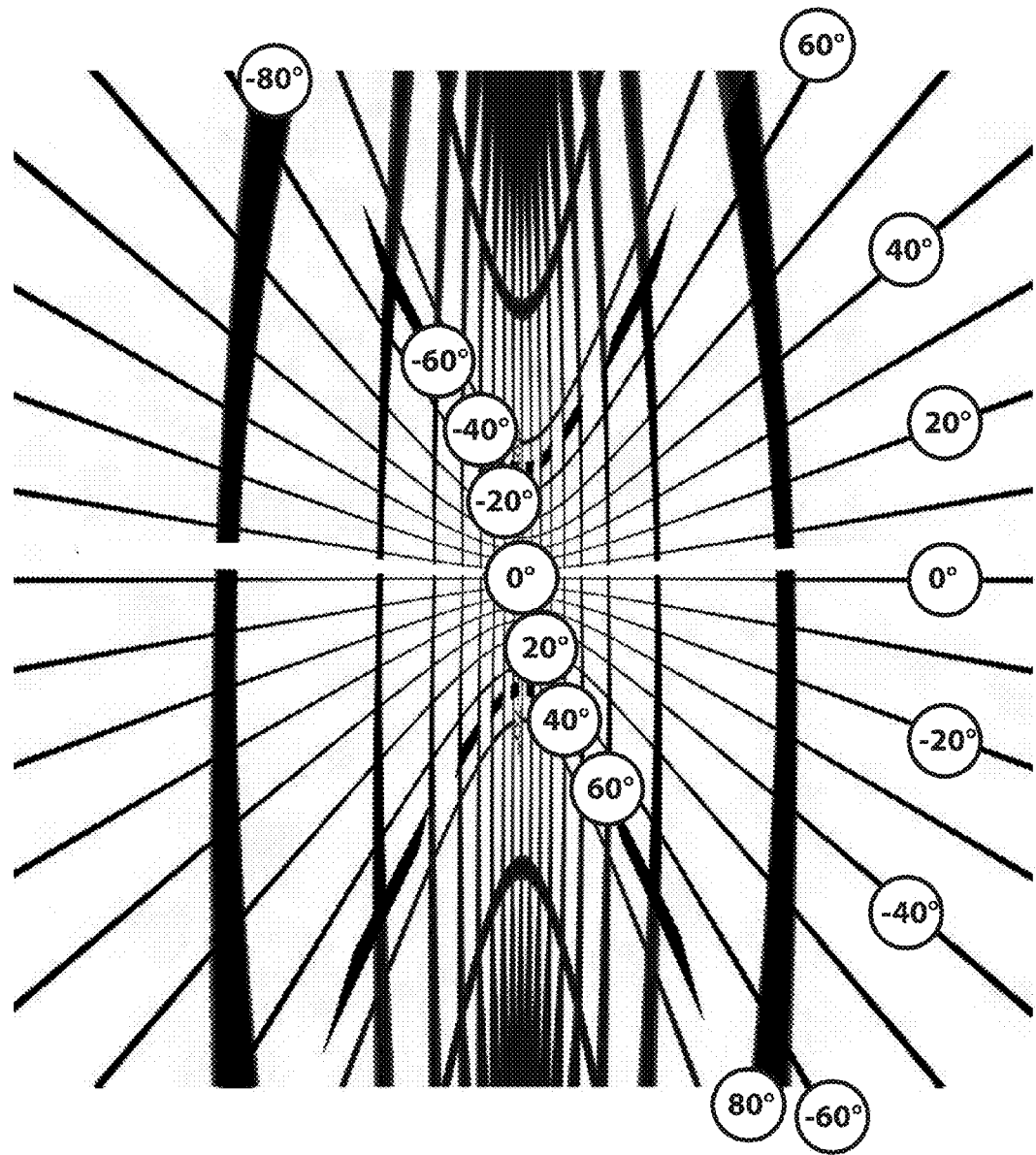
Figure 2E:
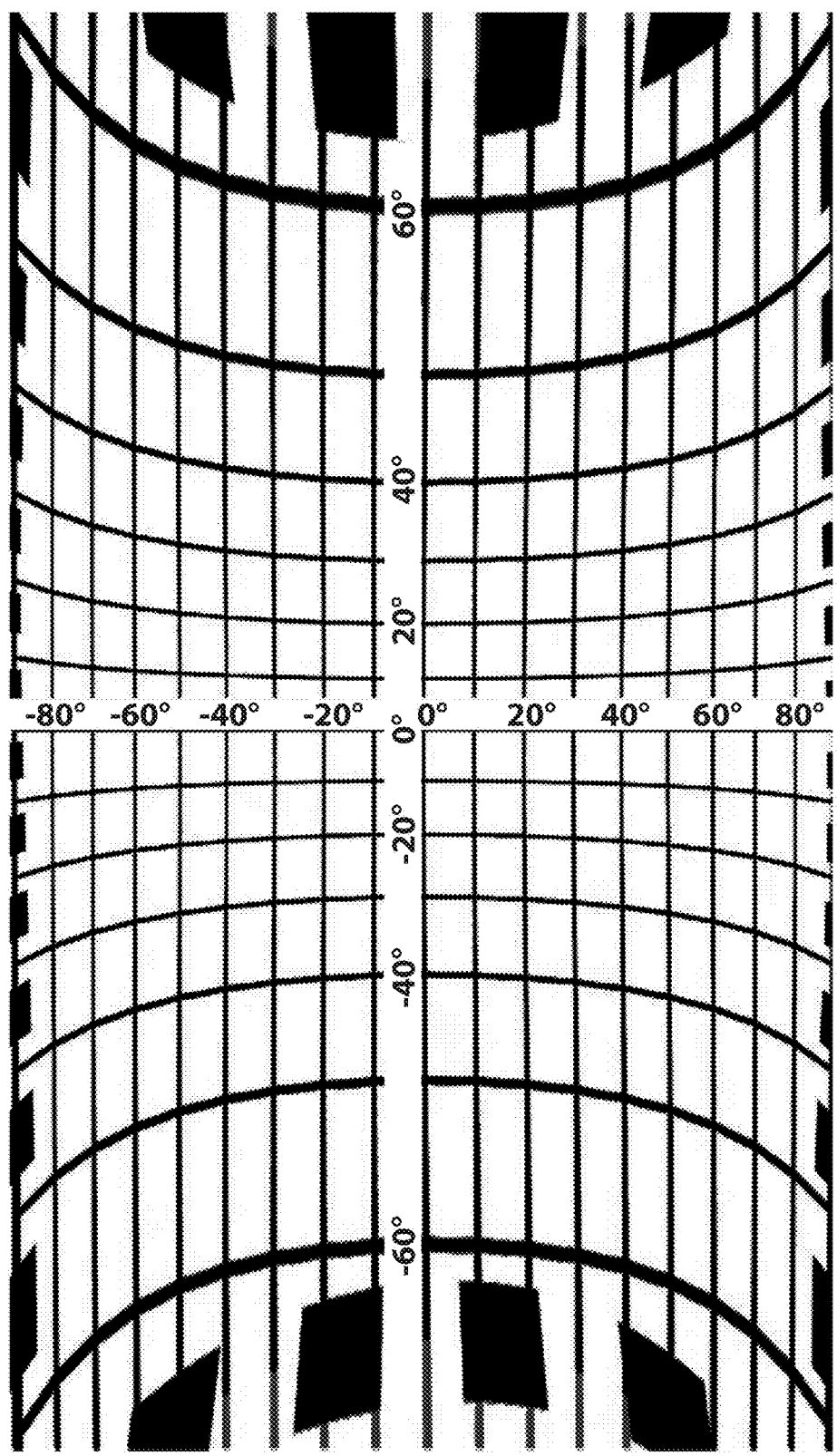

A further step involves defining a co-ordinate map that is overlaid on the FoVD, which is termed the 'Field of View Map' or FoVM. The FoVM is used to determine the location of areas and objects within the scene relative to the entire field of view being recorded. In one embodiment of the invention, the field of view is divided into e.g. 180 degrees horizontally and 130 degrees vertically. In this case, each horizontal degree represents $\frac{1}{180}^{th}$ of the total field of view at VP in that axis and each vertical degree represents $\frac{1}{130}^{th}$ of the total field of view in that axis. A value of −90 is set at the extreme left of the FoVM corresponding to the extreme left of the FoVD, a value of 90 at the extreme right of the FoVM corresponding to the extreme right of the FoVD, a value of −65 at the extreme lower edge of the FoVM corresponding to the extreme lower edge of the FoVD, and a value of 65 at the extreme top edge of the FoVM corresponding to the extreme top edge of the FoVD in such a way that the outer perimeter of the FoVM corresponds to the outer edge of the FoVD and hence the outer edge of the field of view of the scene being represented (FIG. 2a). The shape of the FoVM will vary depending on the method used to capture the scene (examples are given in FIGS. 2b to 2e).

The FoVM can be generated for the FoVD captured for one eye in a monoscopic view, or for both eyes separately in a stereoscopic view, or for the combined view of both eyes in a cyclopean view. In addition, where necessary the FoVM includes a 3-dimensional co-ordinate system, defined in suitable units, that provides a measurement of distance between objects in the scene and the VP in the depth dimension as specified at the time the FoVD is created.

Figure 3:
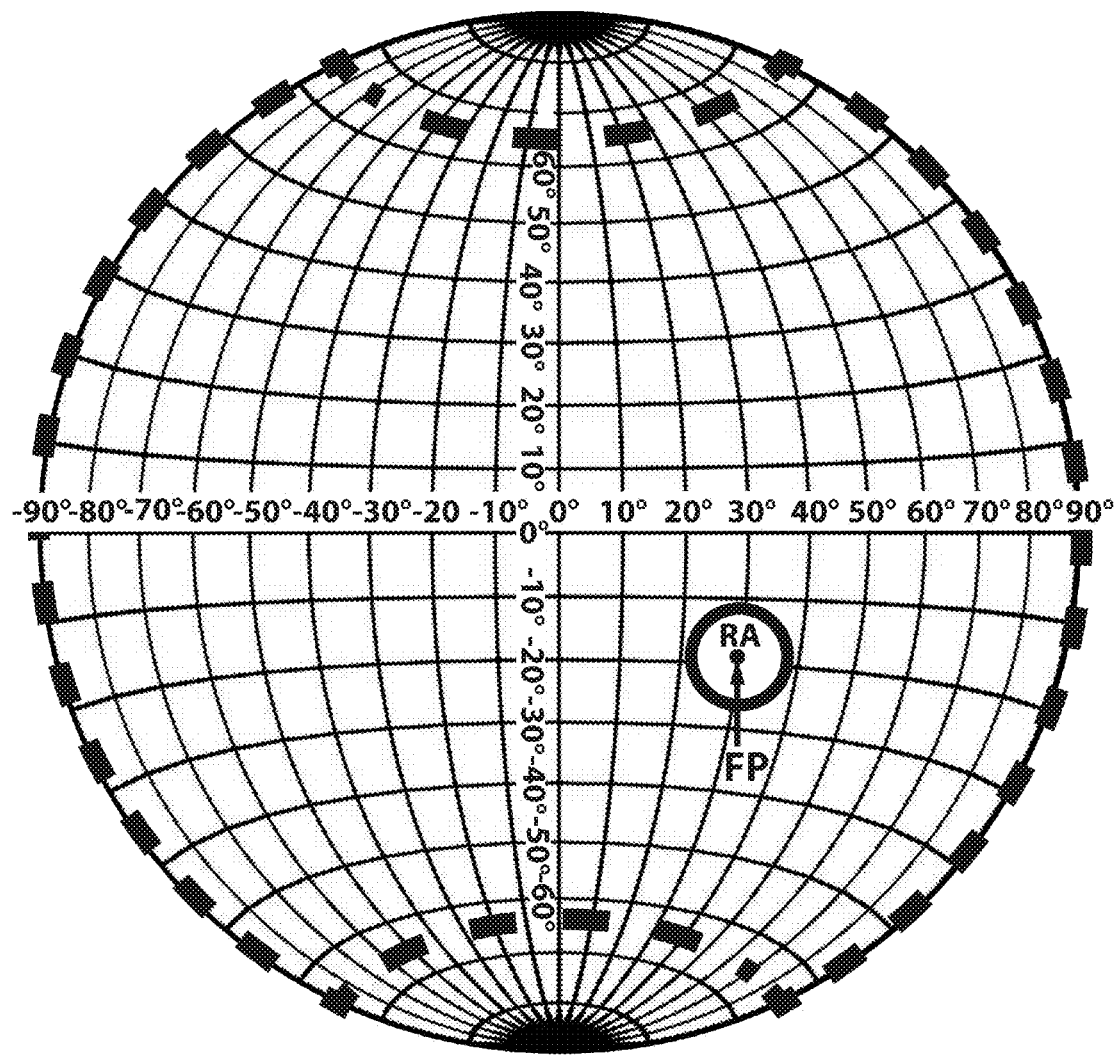

A further step involves specifying on the FoVM the location of the FP corresponding to the part of the scene, or object within the scene, fixated on by the human eye, or eyes (FIG. 3). The location of the FP within the horizontal-vertical axis of the FoVM may vary depending which area or object within the scene is specified as the FP and can be defined by the operator or user of the invention, or by an automated process that emulates the setting of a fixation point in a real scene by a human viewer. Where necessary the location of the FP will also have a value measured in the depth dimension, in suitable units, which will depend on the distance between VP and FP. The size of the RA, with FP at its centre, may vary from an area equivalent to 1% of the area of the FoVM to 99% of the area of the FoVM.

Figure 4A:
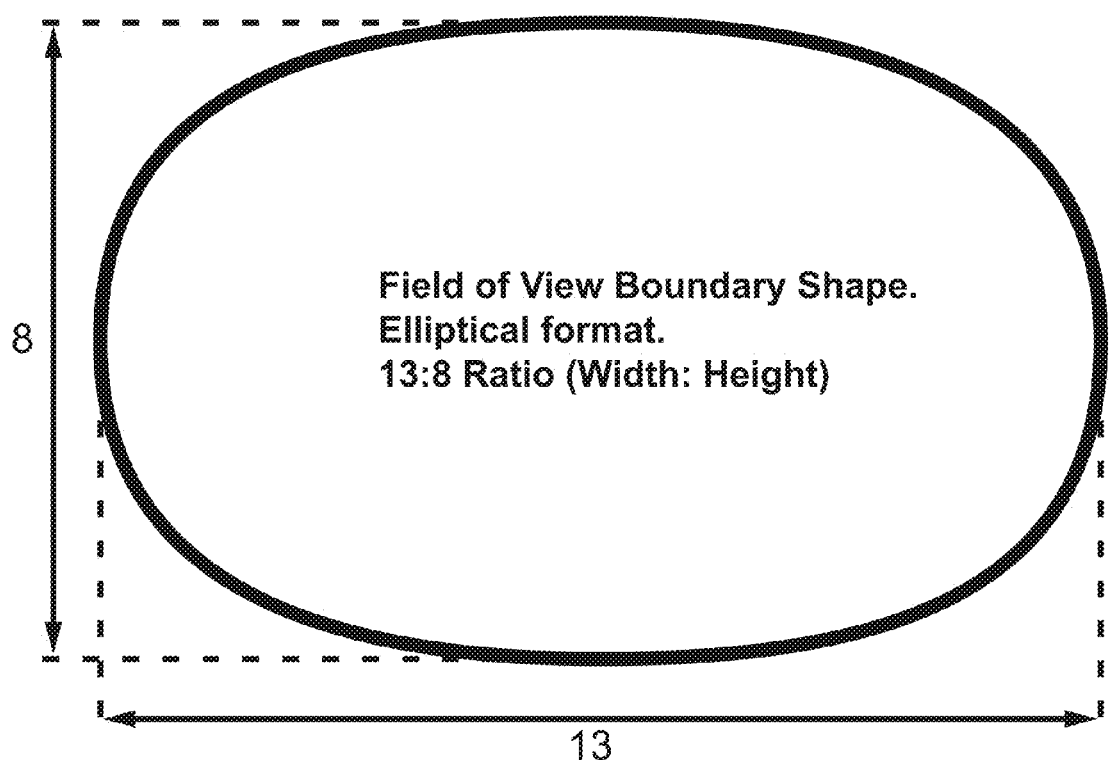
Figure 4B:
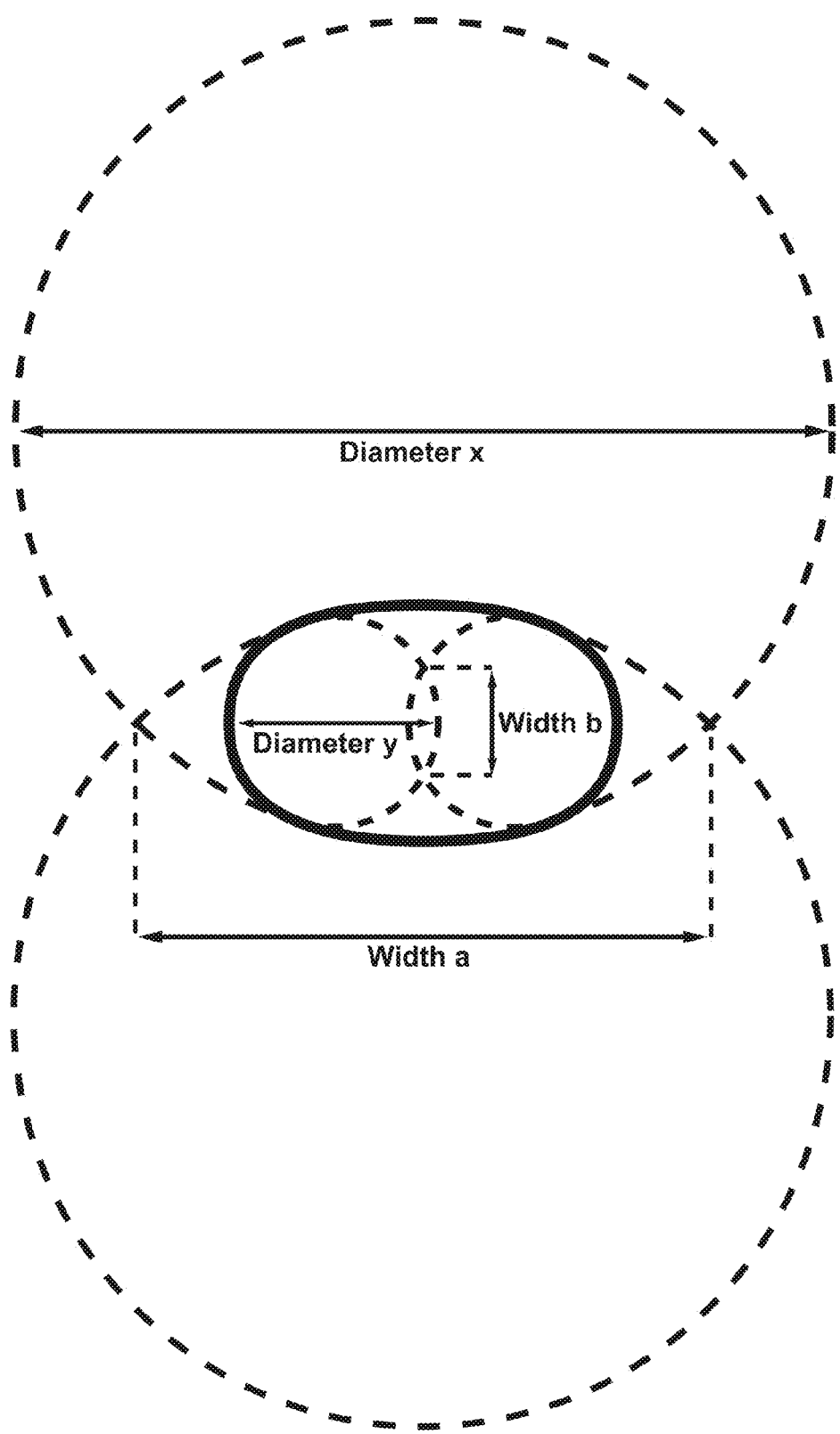

A further step involves creating a 2-dimensional data space onto which the FoVD will be projected according to the method defined in the invention to produce the final image. This data space is defined as the 'Field of View Image' (FoVI). This data space will normally have a landscape-oriented aspect ratio of 13:8 within which the scene is represented, and be elliptical in shape (see FIG. 4a). Other aspect ratios or shapes may be applied to the FoVI as necessary to represent the scene. The geometry of the ellipse is defined in the following way: Two circles of diameter x are overlapped so that the width a at the intersection is 70% of x. Two further circles of diameter y, where y is 26% of x, are inserted in the intersection of the larger circles and overlapped so that the width of their intersection is b, where b is 35% of y. The ellipse is formed from a line at the boundary of the intersecting circles, as shown in FIG. 4b. Other aspect ratios or shapes may be applied to the FoVI as necessary to represent the scene.

Figure 5A:
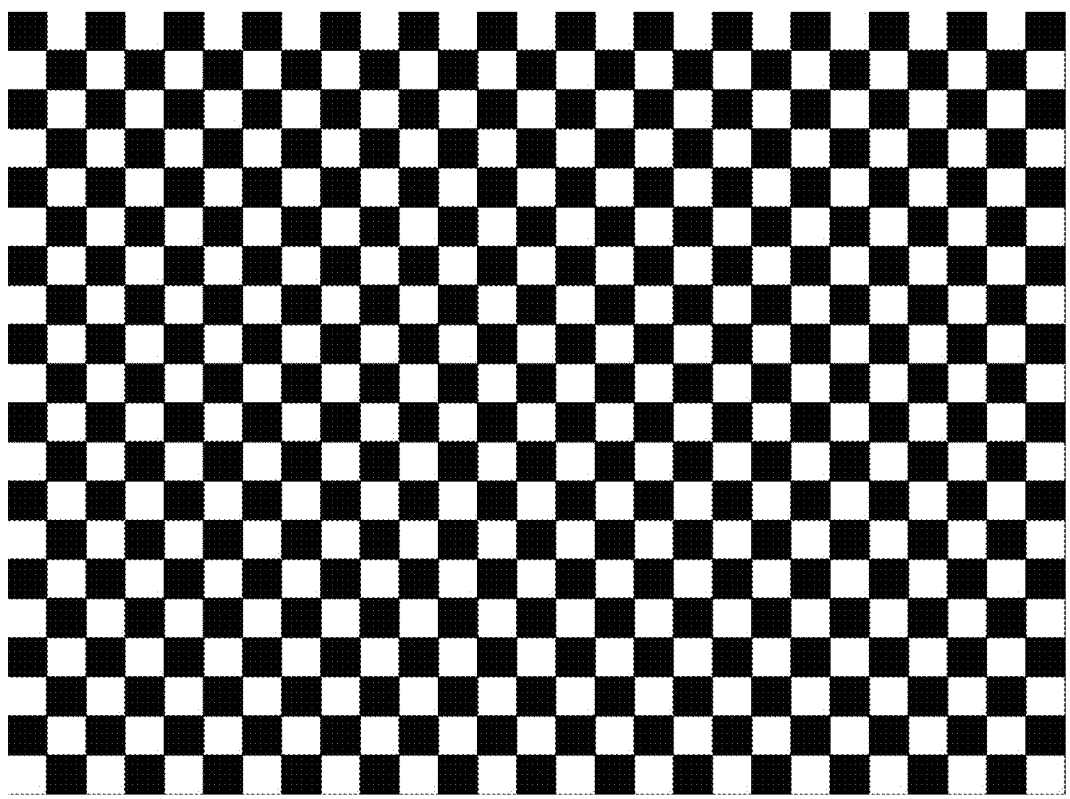
Figure 5B:
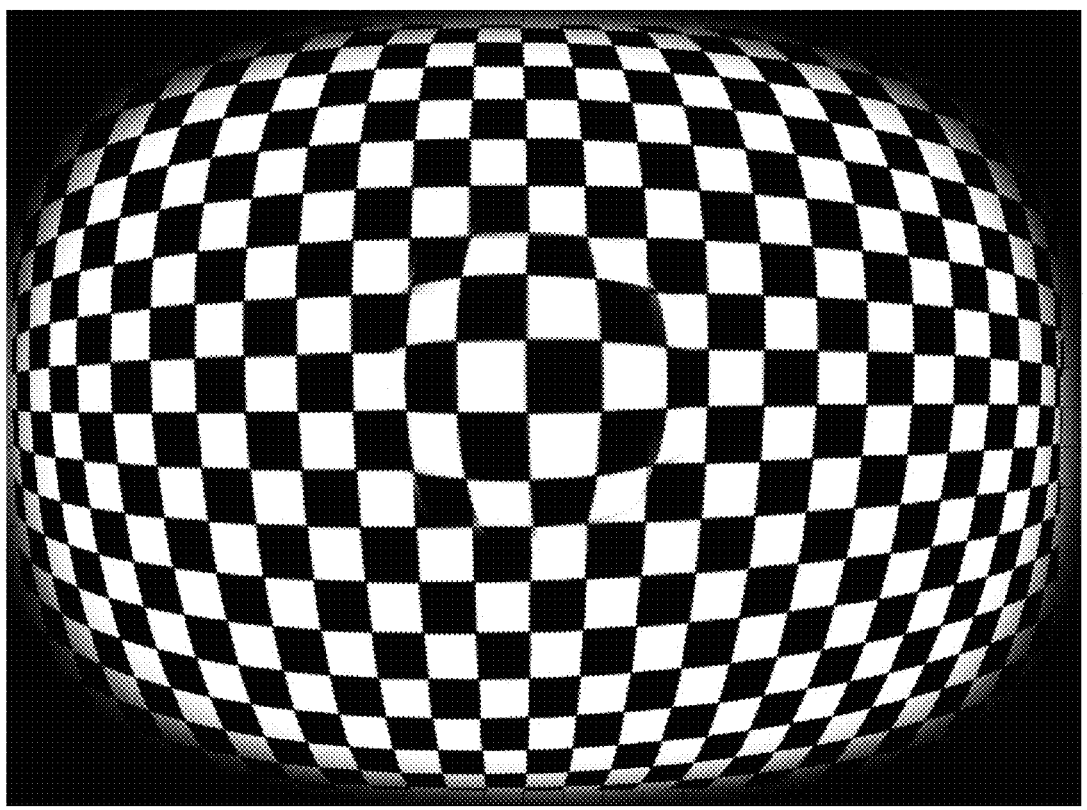
Figure 6A:
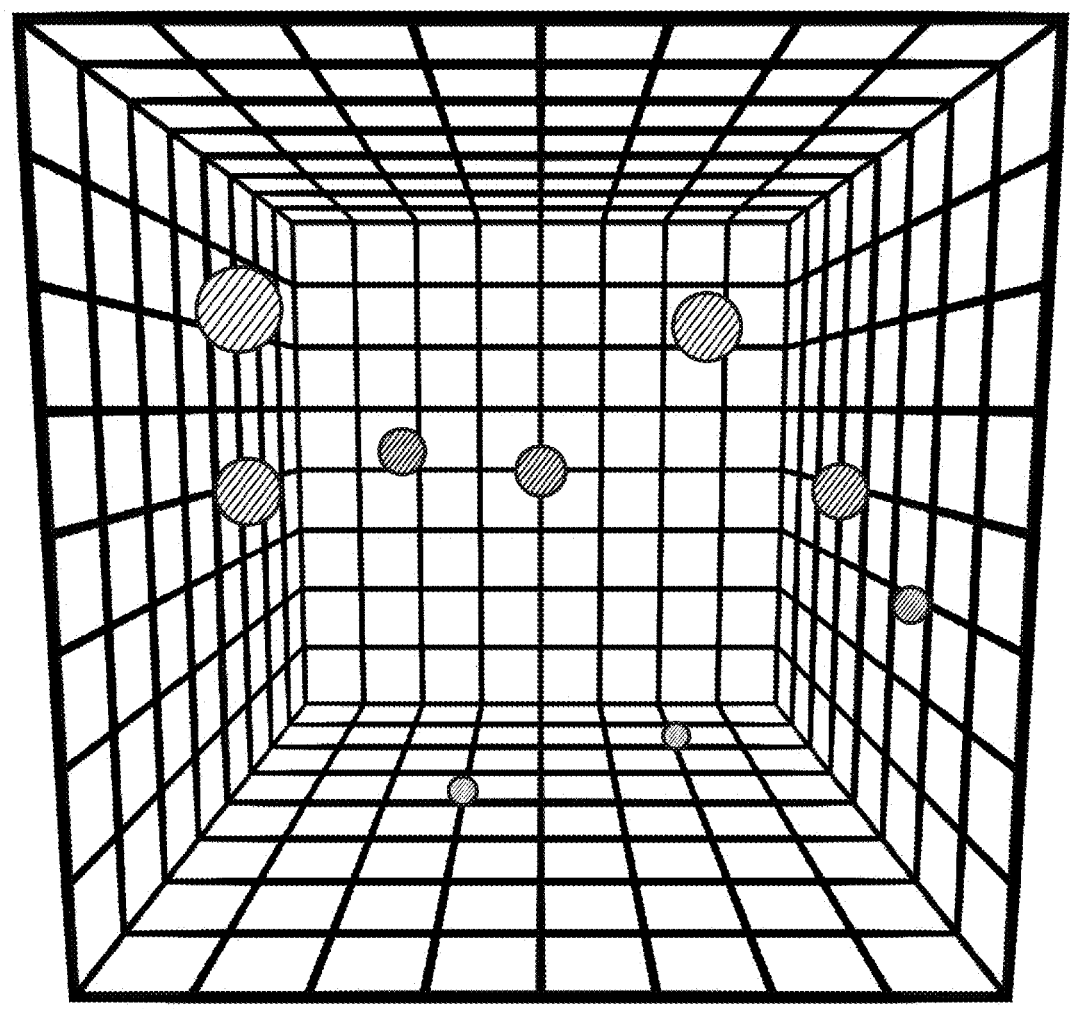
FIG. 6 shows the geometry of an actual 3-dimensional scene projected in 6a monocular linear perspective projection and 6b monocular fisheye perspective projection, in order to compare how the same scene would be projected using a cyclopean projection according to the method described in the invention, as shown in 6c. In this case the RA is the central disc, with FP at the centre of the disc.
Figure 6B:
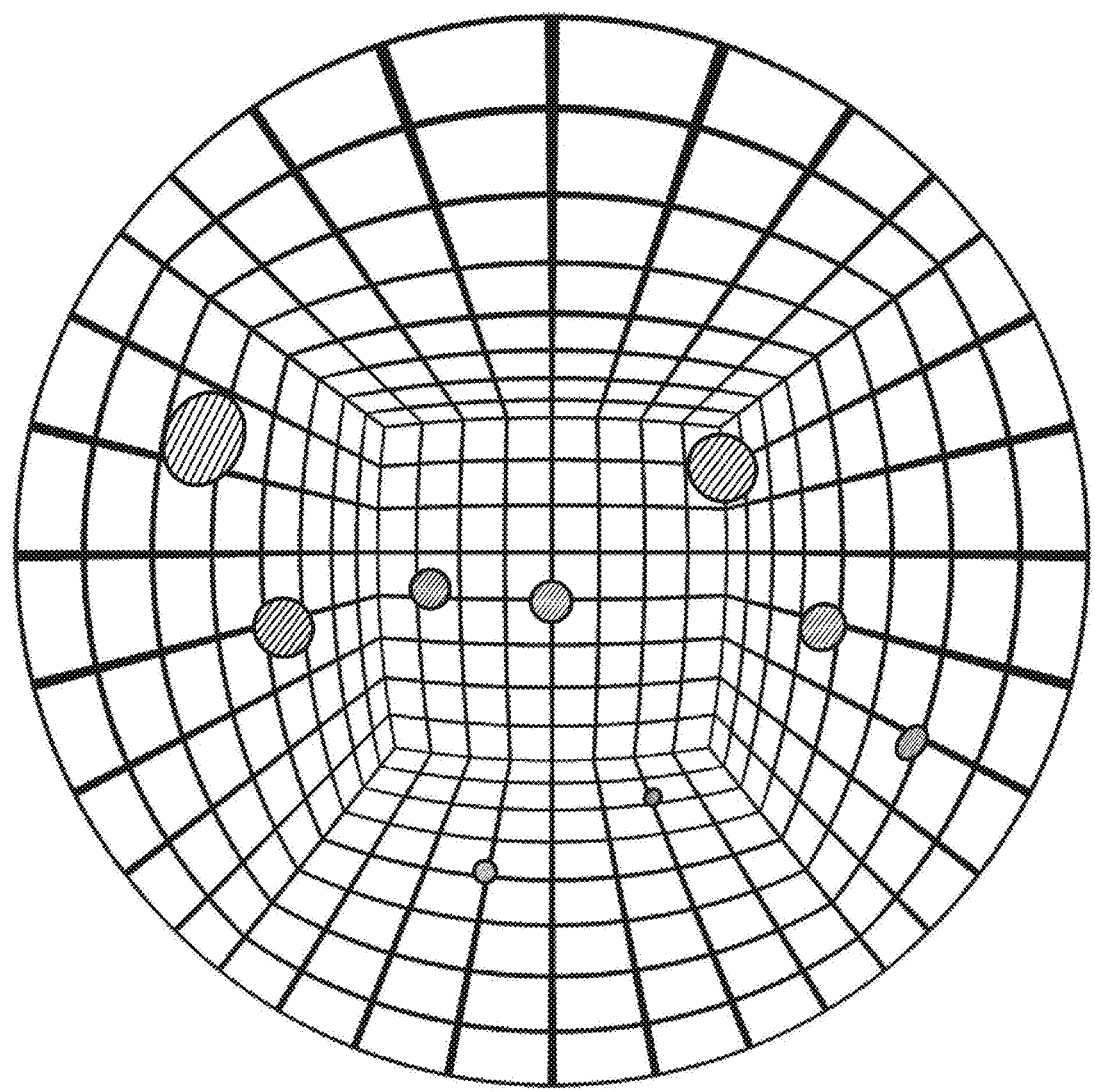
Figure 6C:
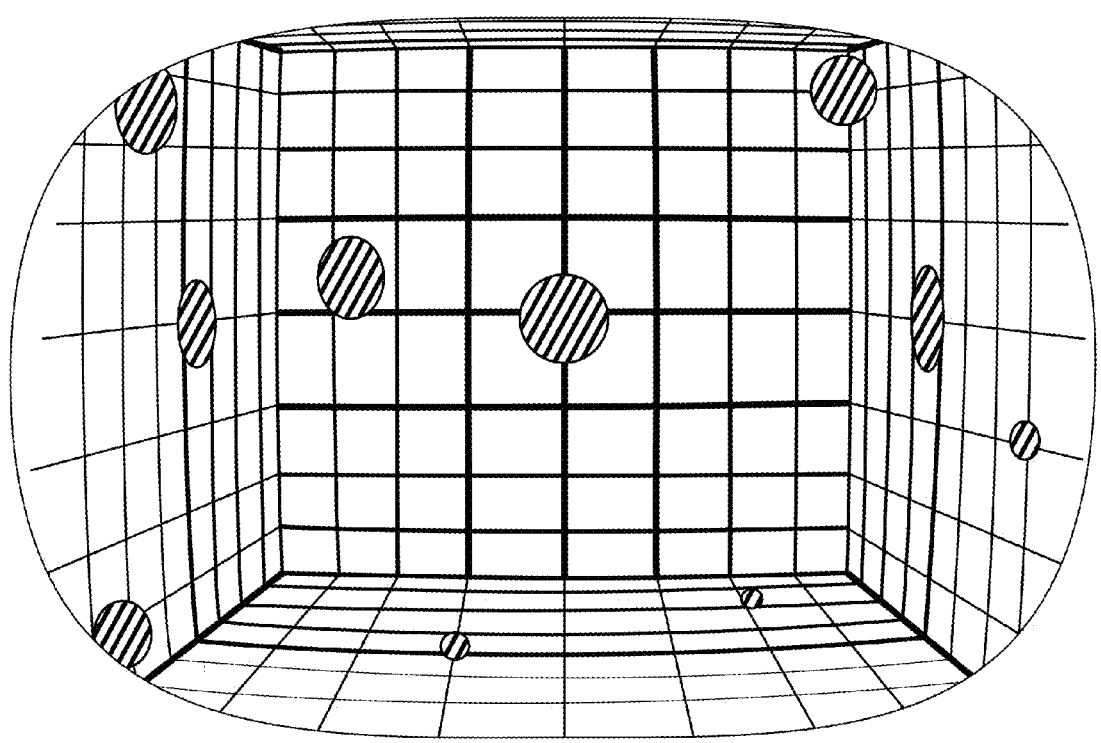

While the specific properties of each FoVI will vary depending on the scene being depicted and the point of view being emulated, the general geometric structure of a FoVI will differ from a typical linear perspective projection of the same scene. For the purposes of illustration only, assuming the visual data concerning object size and position in a linear perspective projection is represented schematically as 2-dimensional checkerboard pattern, the representation of that data in the FoVI will typically differ in the way illustrated in FIG. 5. The area of the scene corresponding to the RA, which can be any shape, will normally occupy a greater proportion of the image than objects or areas outside the RA, progressively decreasing in size towards the boundary of the visual field. Objects or areas of the scene will become increasingly compressed in the horizontal axis as they approach the left and right of the image and increasingly compressed in the vertical axis as they approach the top and bottom of the image. Overall scaling effects are also modulated by attention span and relative depth of objects within the scene, and spatial curvature will be introduced at the outer areas of the image, resulting in an image that is elliptical in shape. By way of further illustration, FIG. 6 shows the geometry of an actual 3-dimensional scene projected in 6a monocular linear perspective projection and 6b monocular fisheye perspective projection, compared to how the same scene would be projected using a cyclopean projection according to the method described in the invention, as shown in 6c. In this case the RA is the central grey disc, with FP at the centre of the disc. Note in 6c the greater amount of compression in the upper part of the image compared to the lower part, this being due to the angle of view being represented in the image, given by the position of the viewer's head in relation to the scene.

Figure 7:
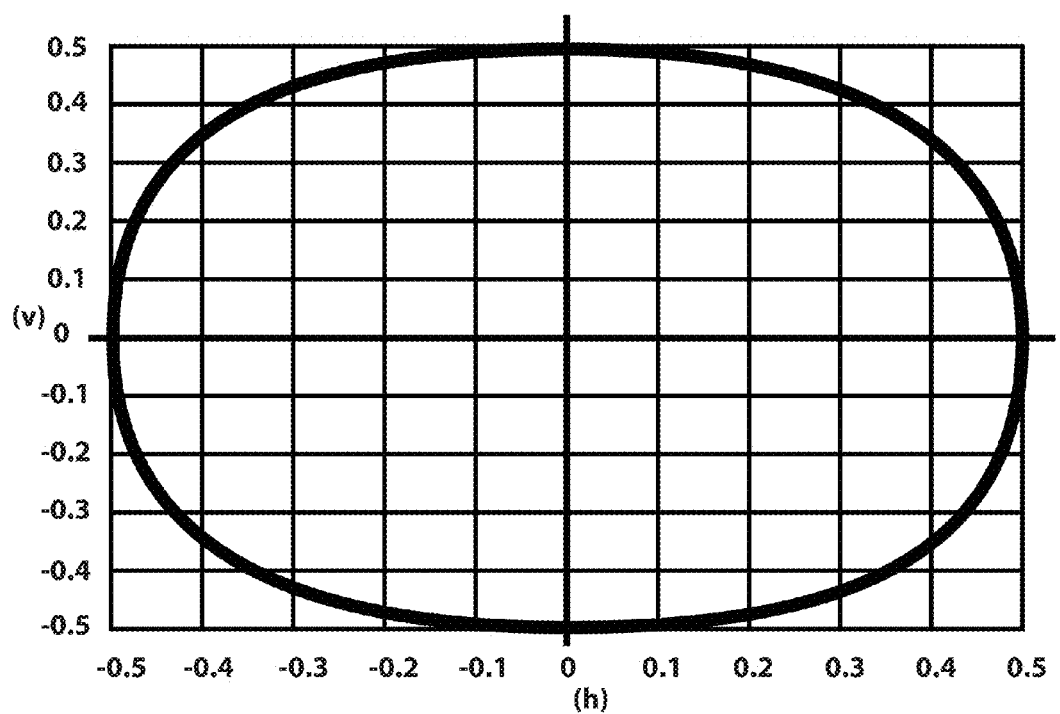
FIG. 7 shows an example FoVI co-ordinate map showing the division of the depicted area into units.
Figure 8A:
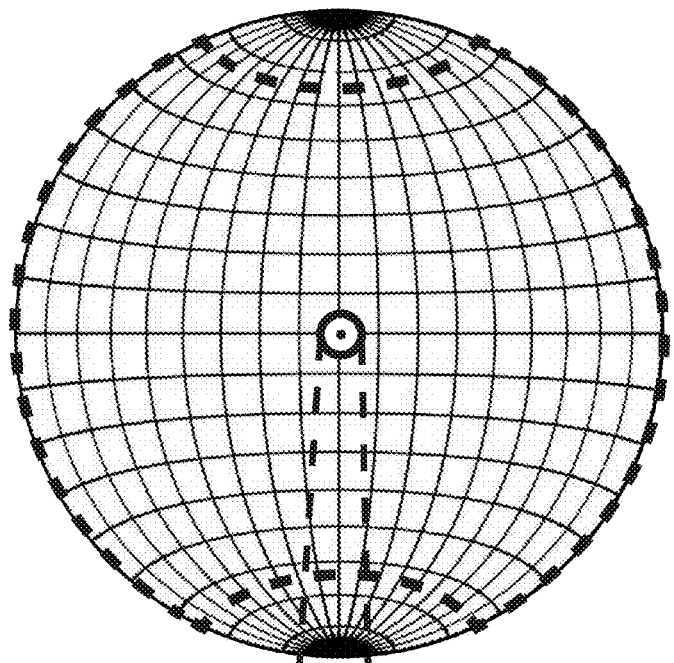
FIGS. 8a to 8e represent the transformation for different fixation points in the scene.
Figure 8A:
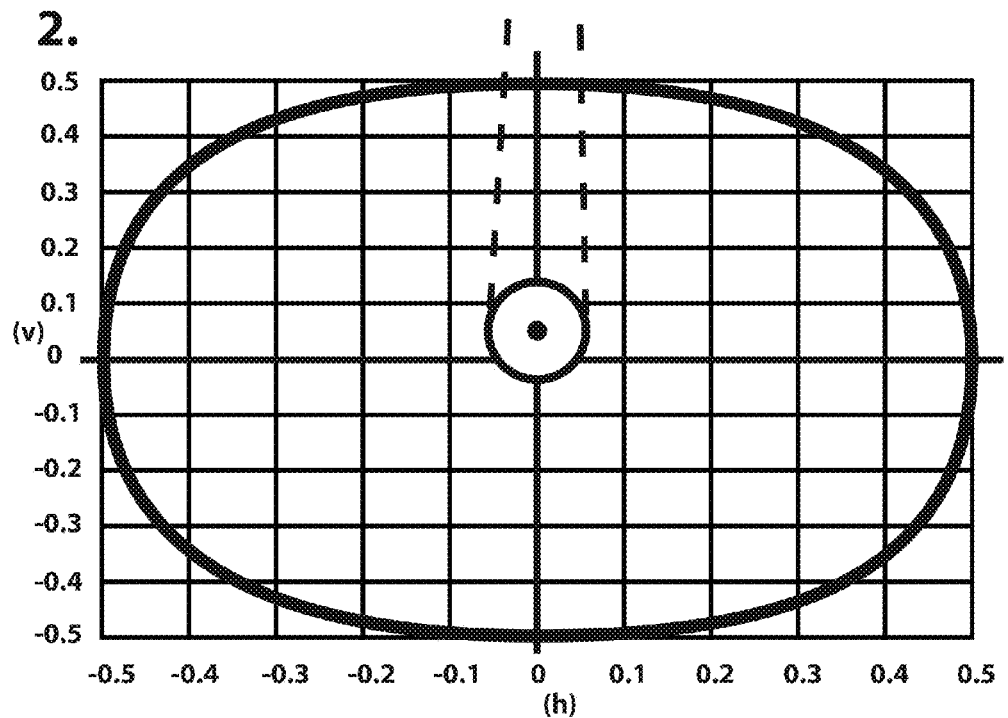
Figure 8B:
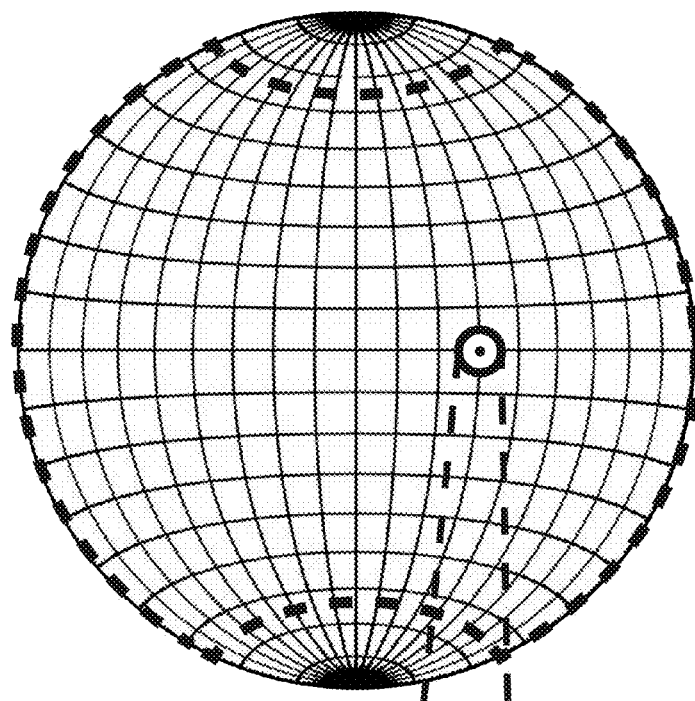
Figure 8B:
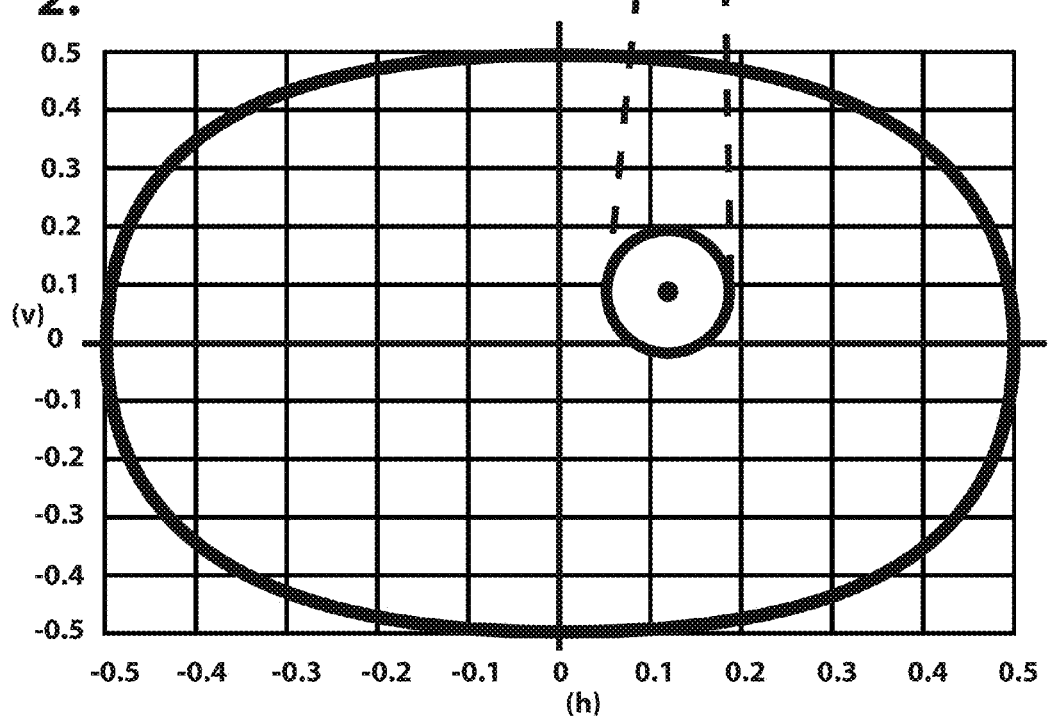
Figure 8C:
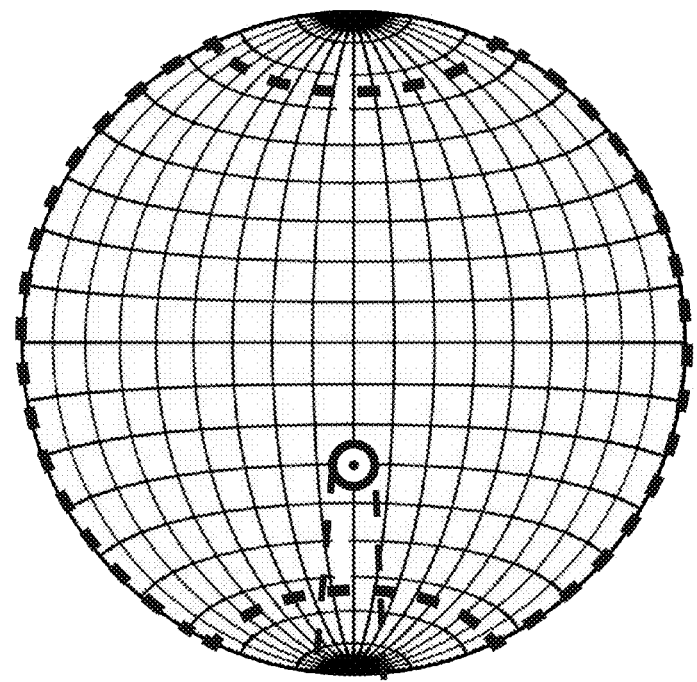
Figure 8C:
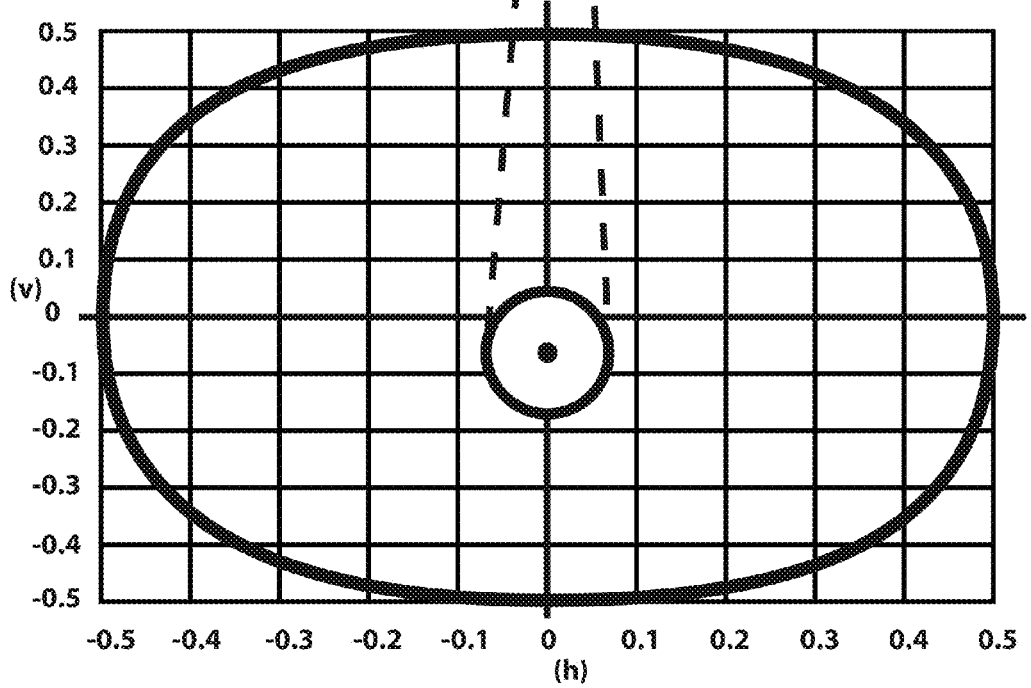
Figure 8D:
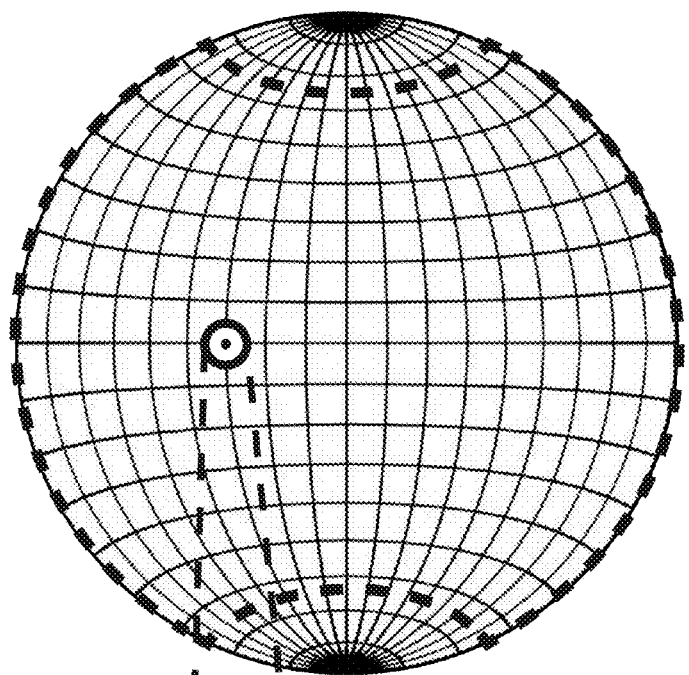
Figure 8D:
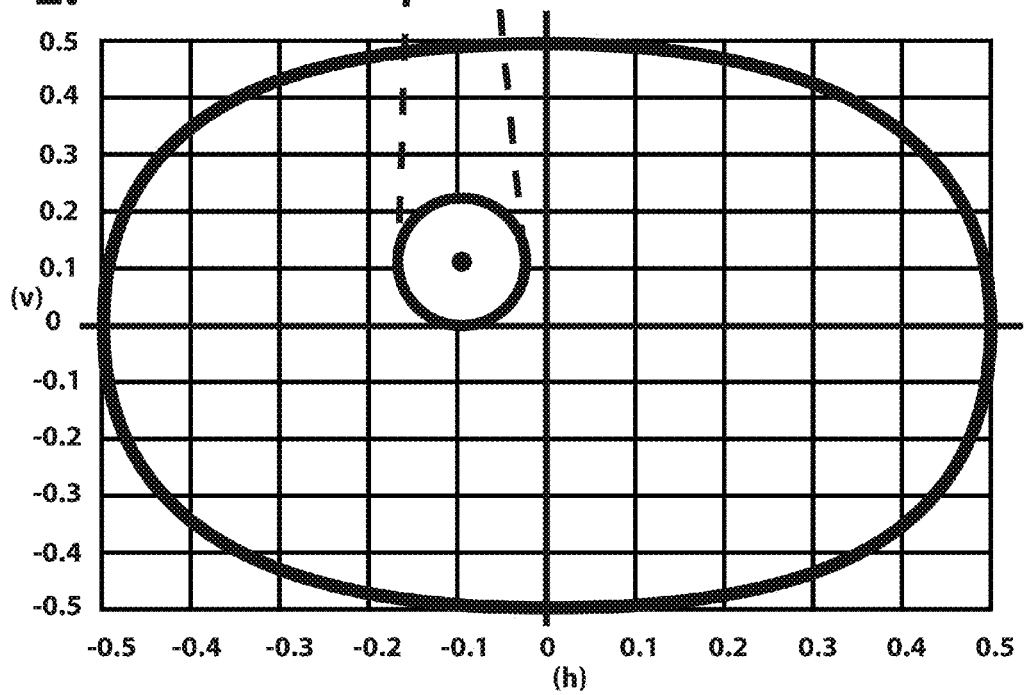
Figure 8E:
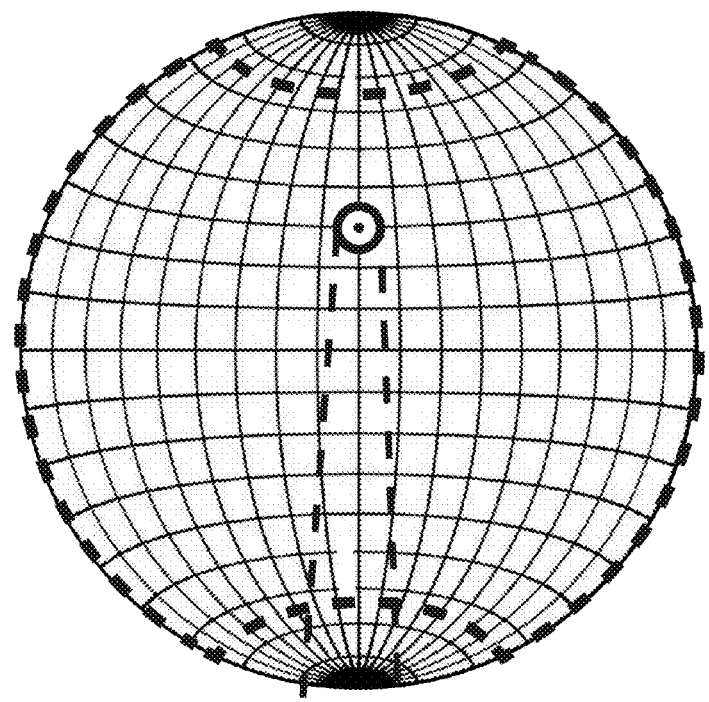
Figure 8E:
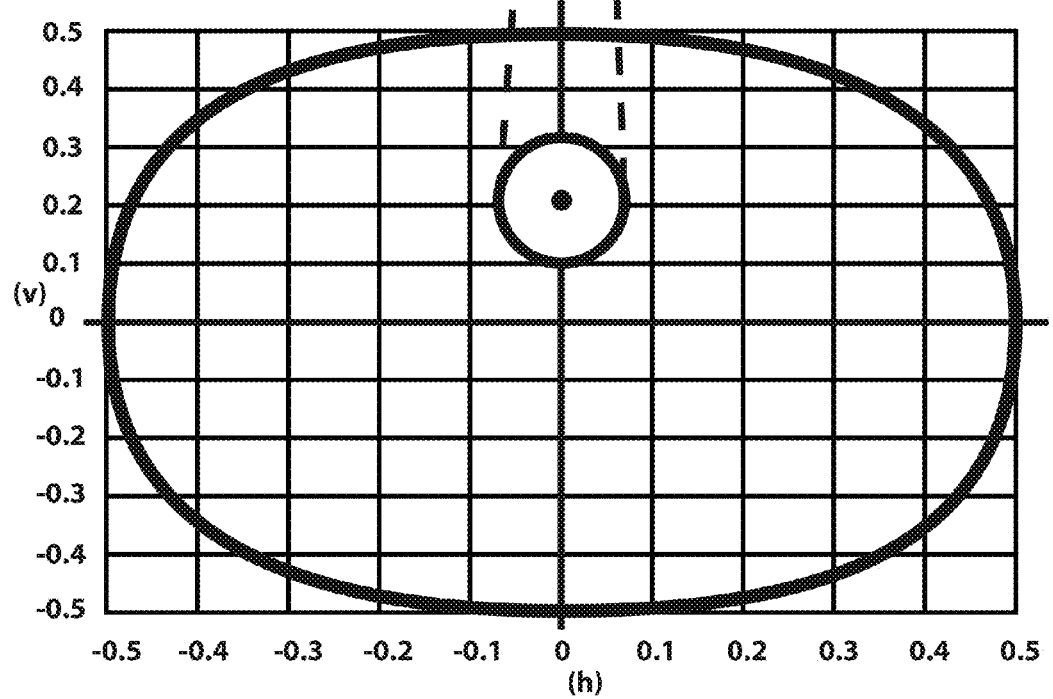

In order to achieve the desired rendering of data in the FoVI the process of converting the FoVD requires a number of sub steps, as specified herein. First a 2-dimensional co-ordinate map defined in suitable units, such as degrees, centimetres, pixels, or other units, is overlaid on the FoVI. In one embodiment of the invention, in which a cyclopean image combining the view from both eyes is created, a co-ordinate map is defined with a value of 0 at the centre of FoVI, and a value of −0.5 at the extreme left of FoVI, a value of 0.5 at the extreme right of FoVI, a value of −0.5 at the extreme lower edge of FoVI, and a value of 0.5 at the extreme top edge of FoVI, although other units may be used as required. The manner in which the co-ordinate system is distributed across the FoVI will depend on the properties of the viewpoint being represented, and the variables specified in the steps below. By way of illustration FIG. 7 shows an example distribution of co-ordinates in the FoVI. The perimeter of the FoVI corresponds to the perimeter of the visual field as mapped on the FoVM.

A further step involves mapping the FP and the RA located within the FoVM onto the corresponding co-ordinates in the FoVI (FIG. 8). The transformations by which the co-ordinates of the FP and RA specified in the FoVM are mapped onto the FoVI are shown by example in the five cases illustrated in FIG. 8. In each case the transformation determines the size and position of the FP and RA as it appears in the FOVI. In FIG. 8a(1) the FoVM records where in the visual field the viewer is fixating (in breadth and depth), and how large the region of attention is, measured in degrees of the entire visual field. FIG. 8a(2) illustrates how the same information would be represented in the FoVI according to the present invention, showing the proportion of the total visual field, as well as the position within that field, occupied by the same RA. FIGS. 8b to 8e show the same transformation bases on different fixation points in the visual field.

Figure 9A:
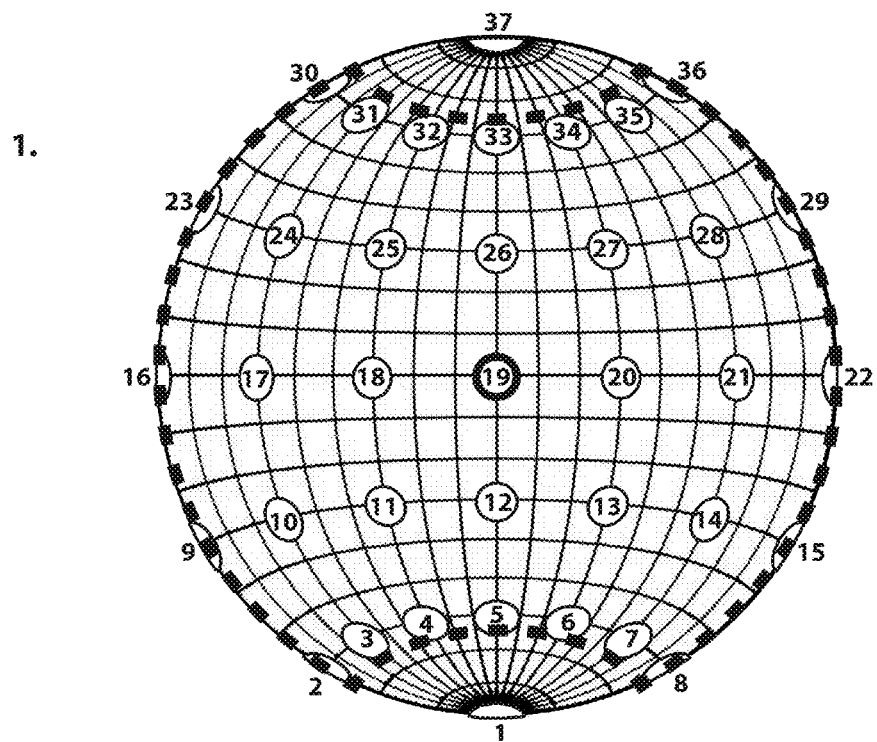
Figure 9A:
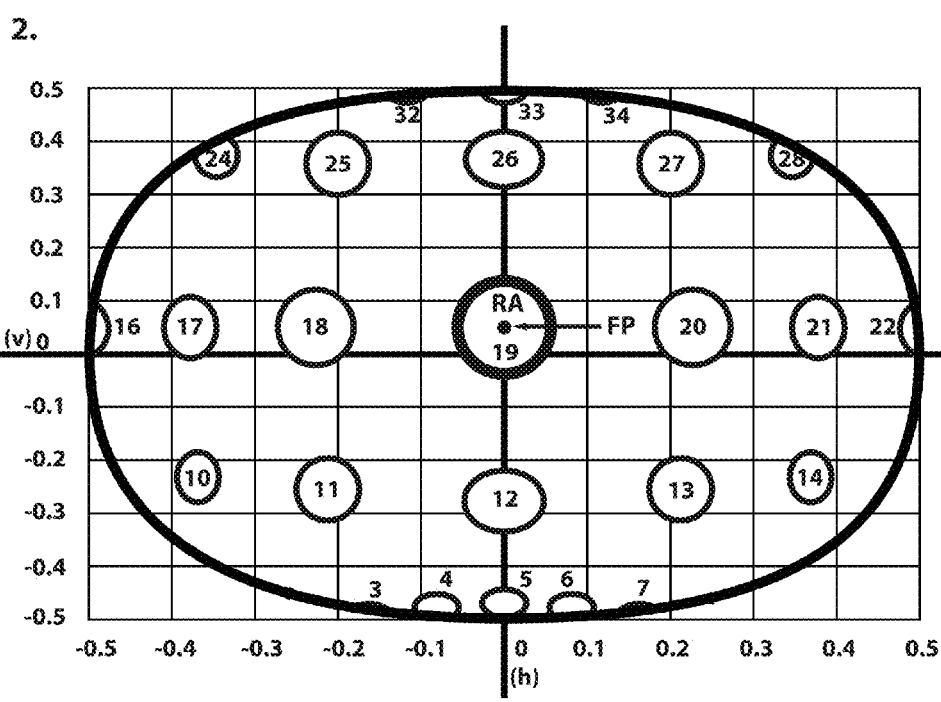
Figure 9B:
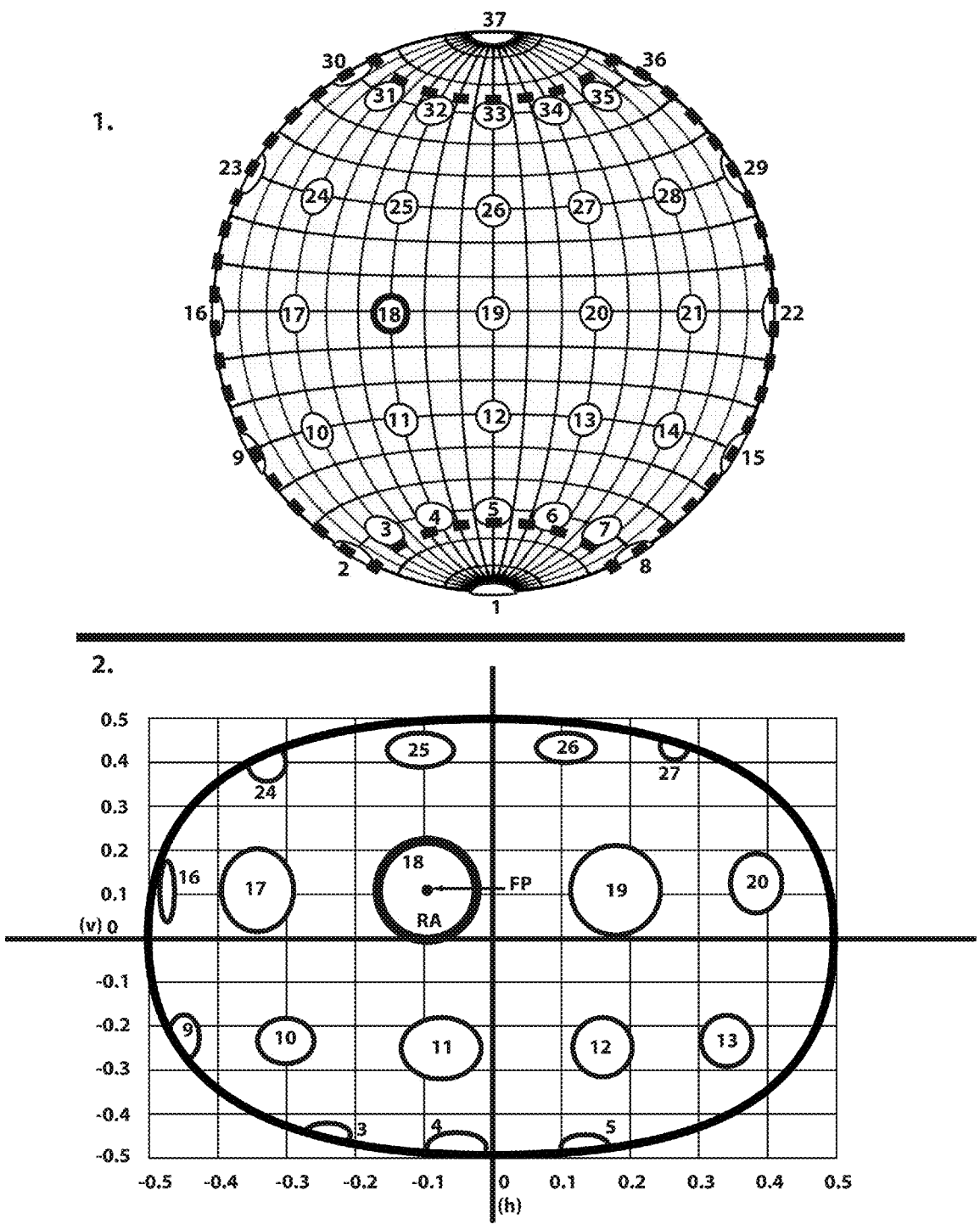
Figure 9C:
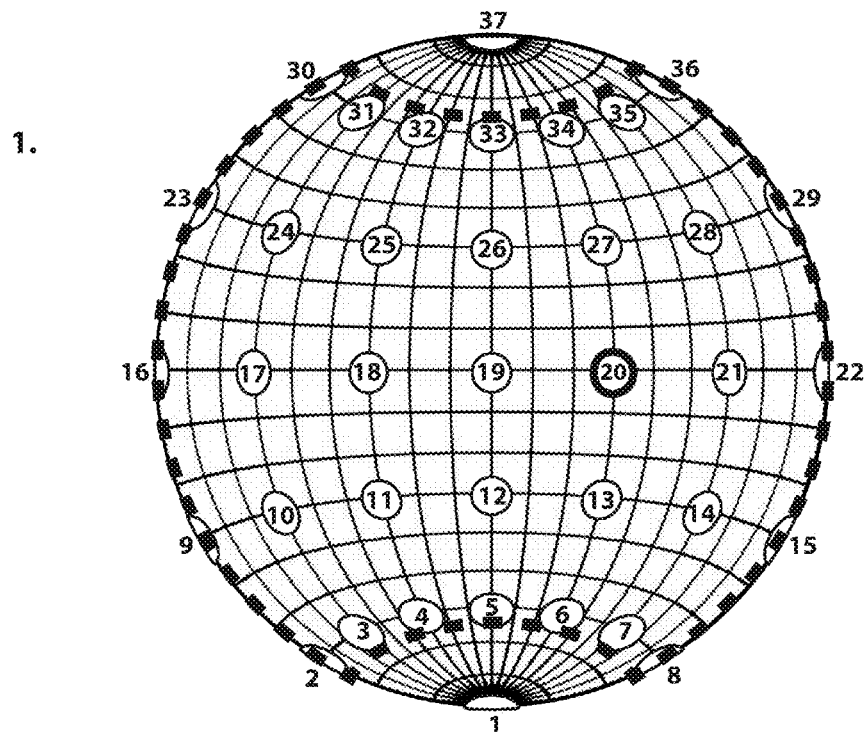
Figure 9C:
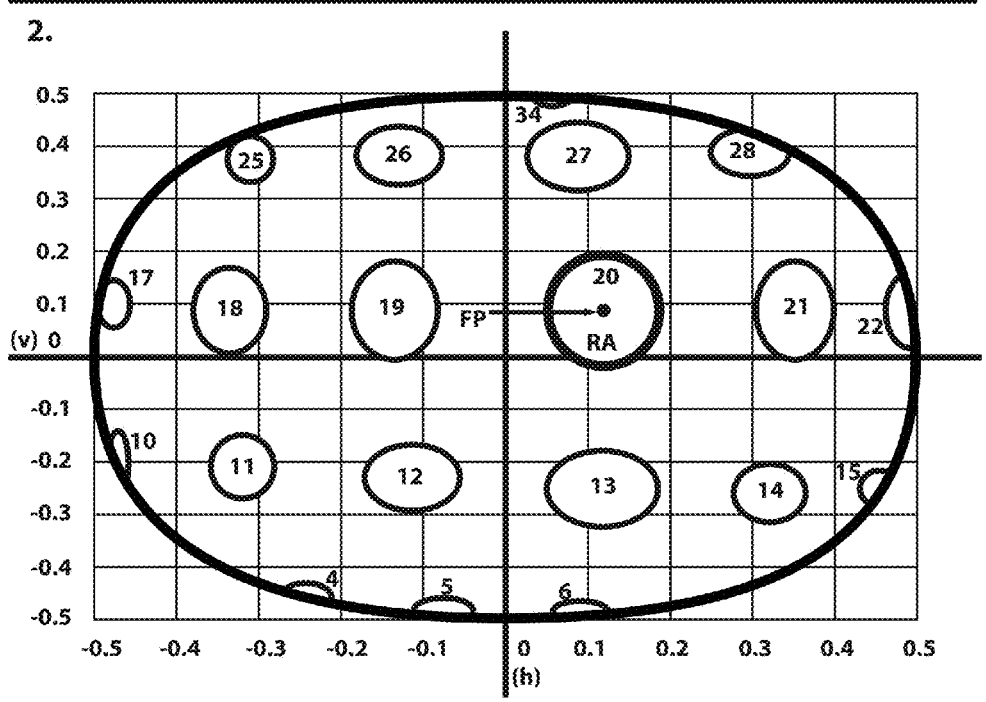
Figure 9D:
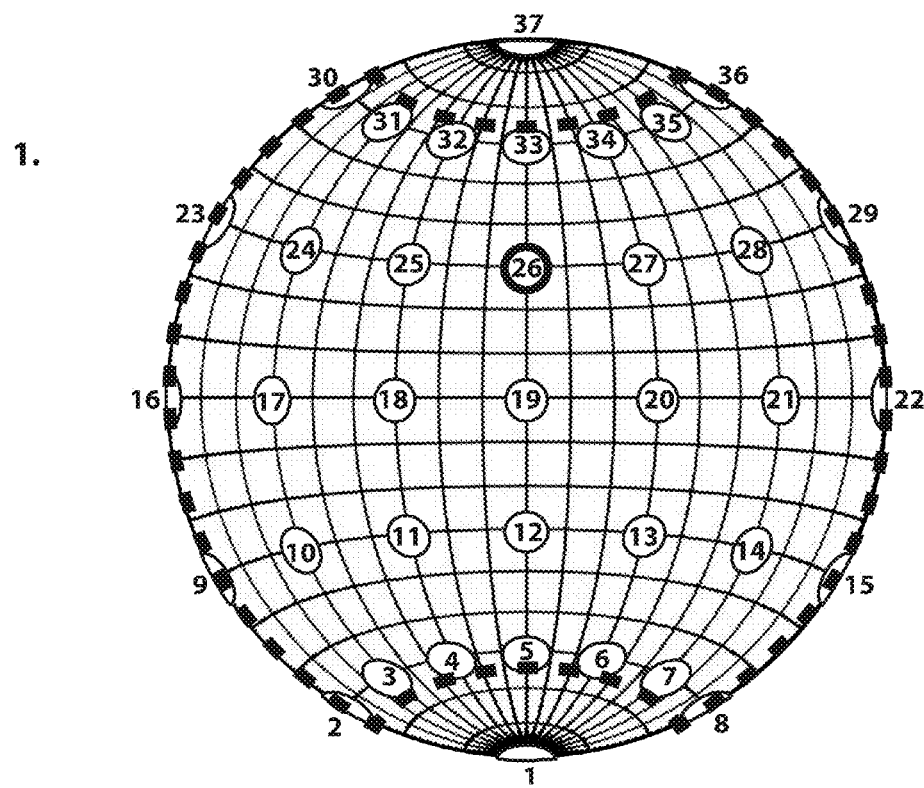
Figure 9D:
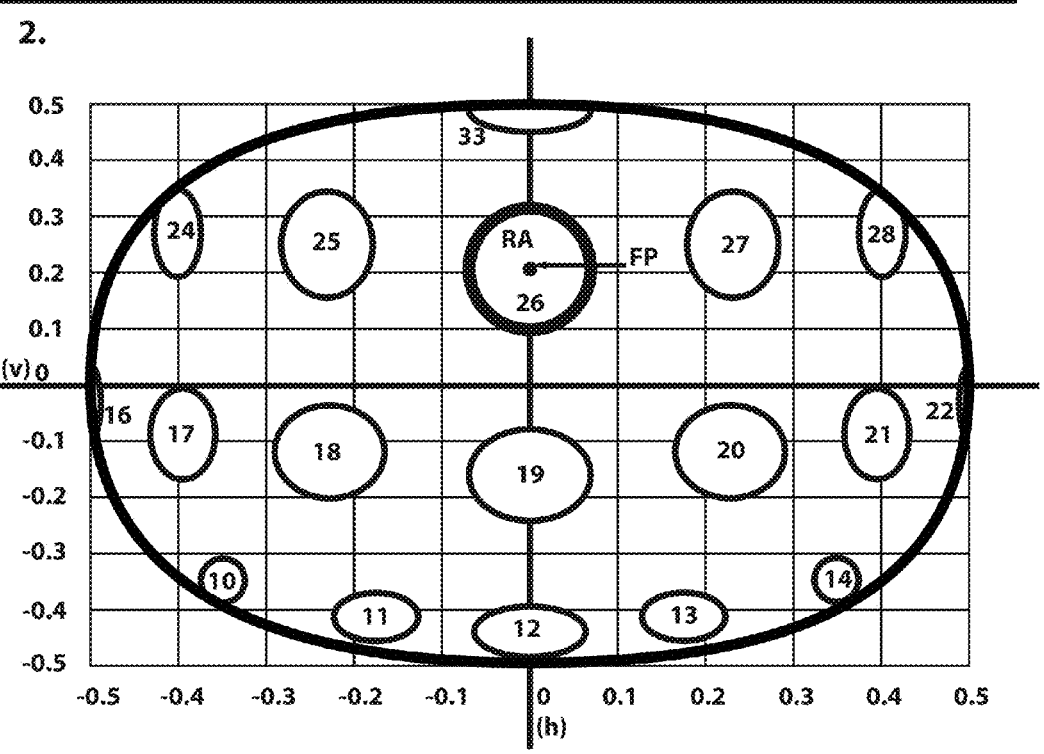
Figure 9E:
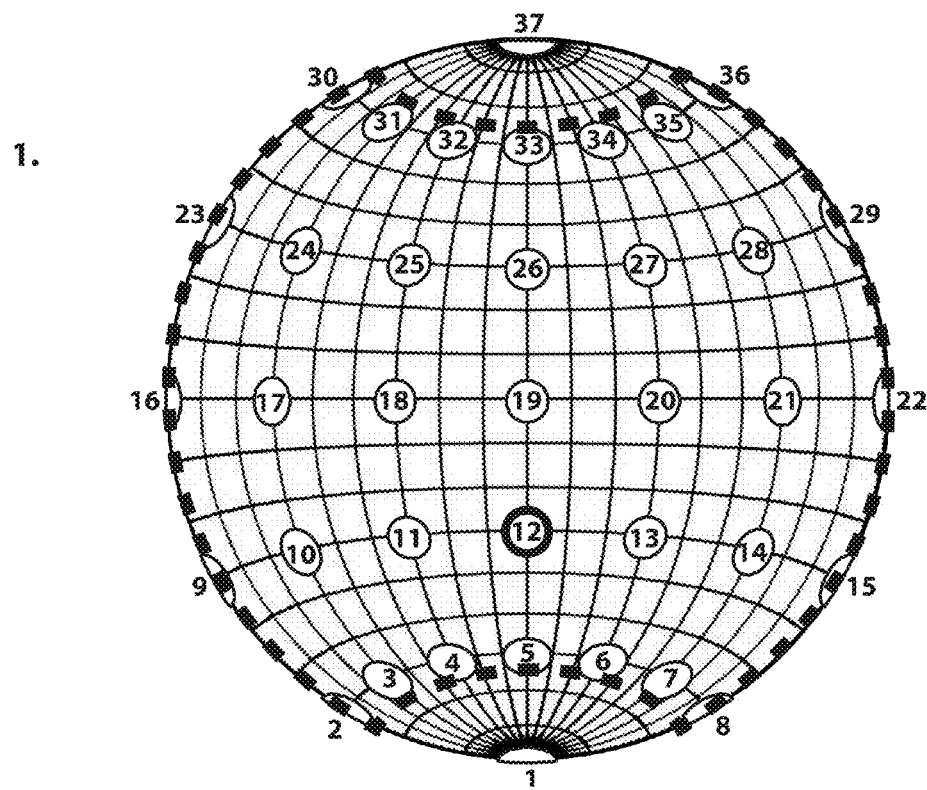
Figure 9E:
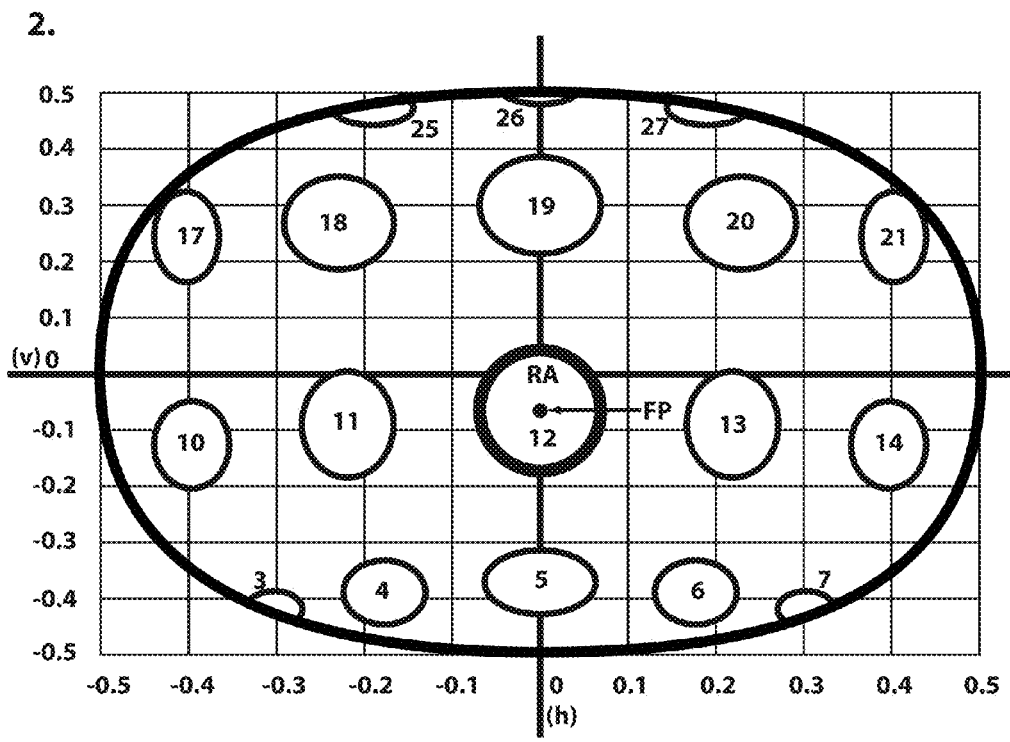

A further step involves mapping the data of the entire visual field captured in the FoVM to the FoVI according the same principle set out in 4.14, but transforming different parts of the visual field by different values according to their absolute position in the field and in relation to the FP and RA. The process is shown by example in the following five cases. FIG. 9a(1) shows a FoVM of a scene consisting of an array of equally sized objects, each spaced at an equal distance from the VP in a hemispherical arrangement viewed in cyclopean mode, that is, combining the view of both eyes. The bold discs represent the RA, with the FP at its centre, in each case. FIG. 9a(2) shows the same scene transformed to the FoVI. Each disc is numbered so that its corresponding size and position in the FoVI can be seen. FIGS. 9a to 9e show examples of how the FoVI will appear based on different FPs within the scene.

Figure 10A:
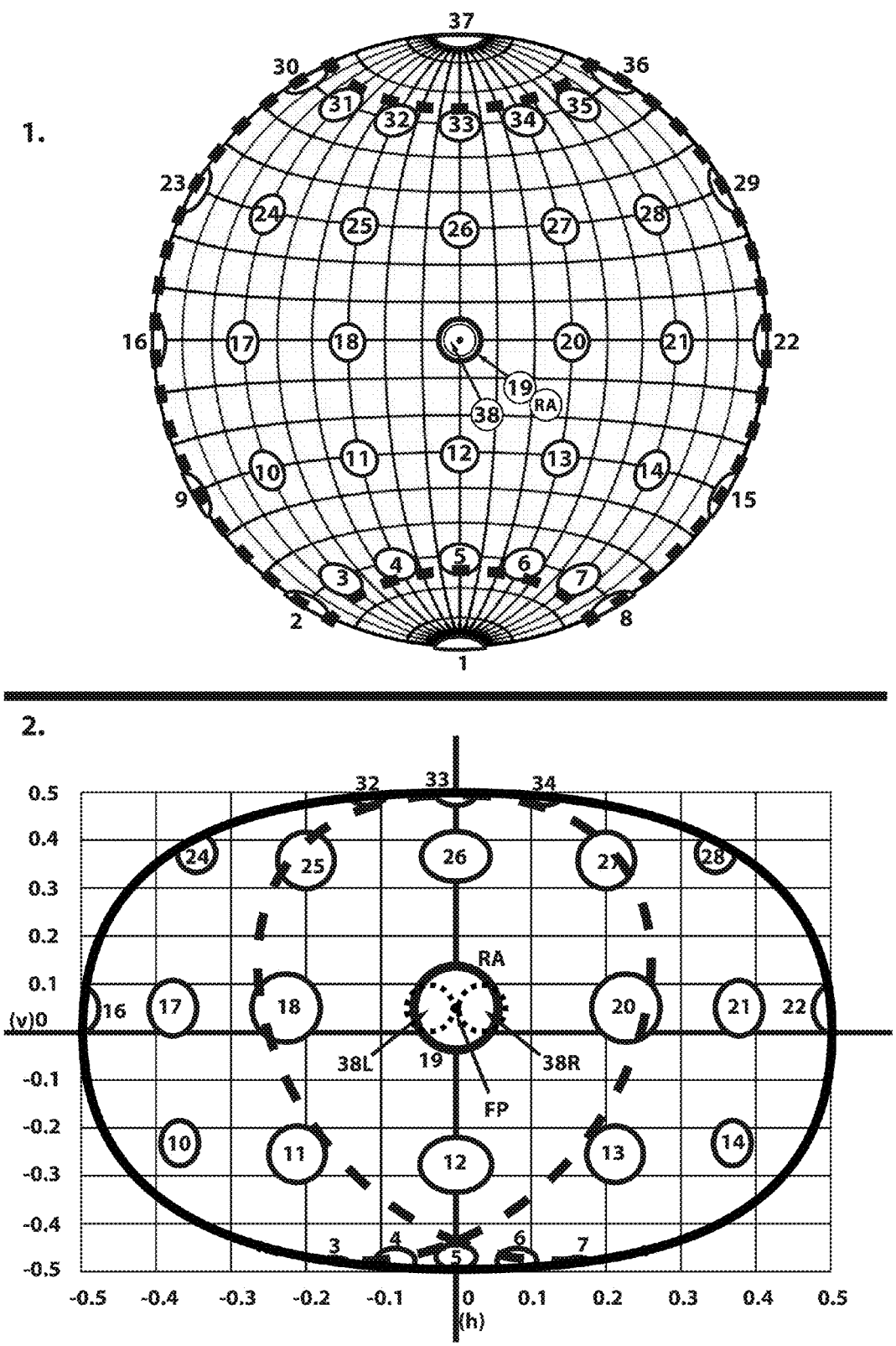
Figure 10B:
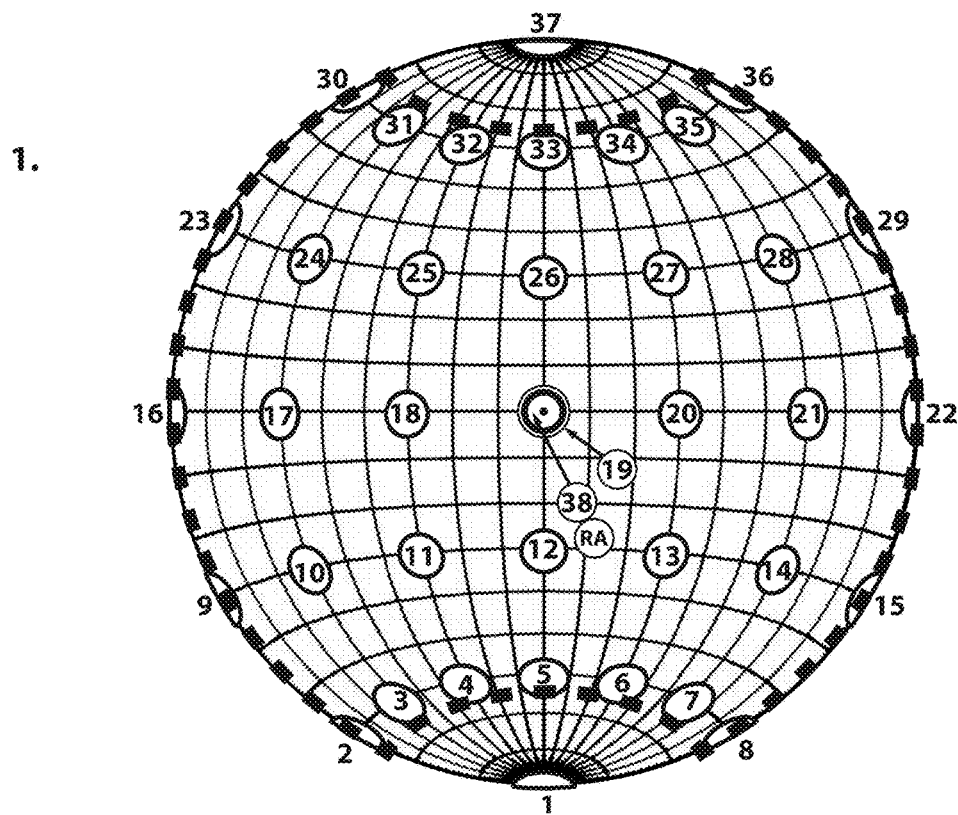
Figure 10B:
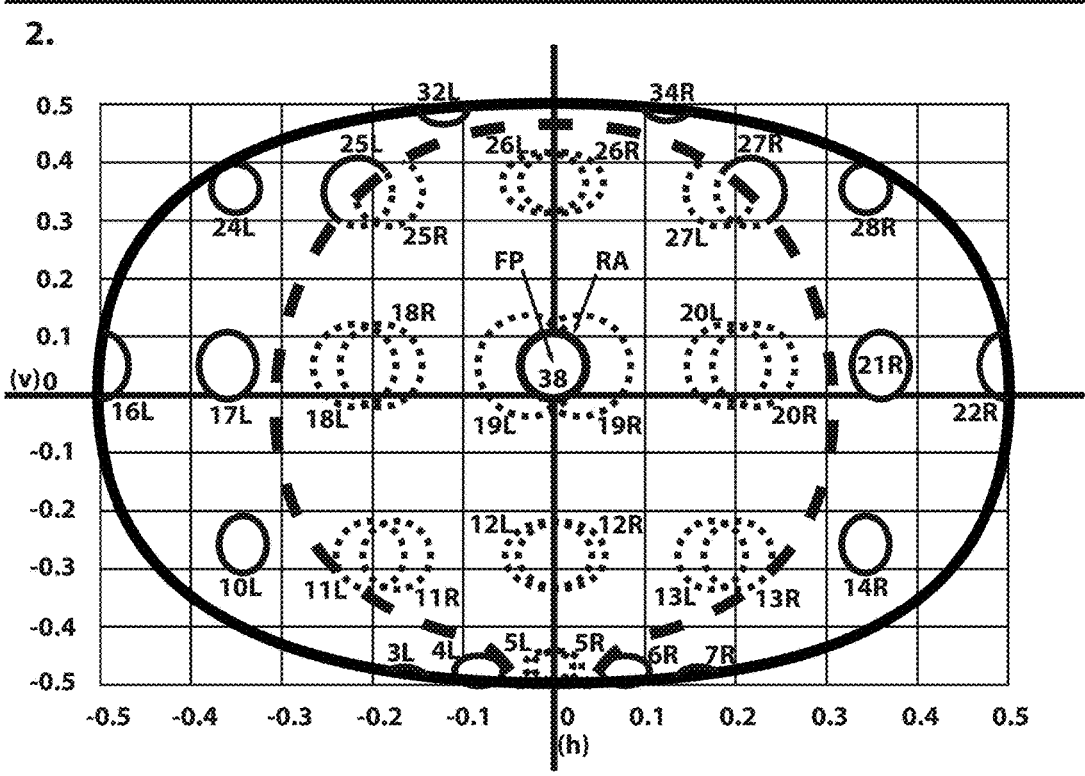
Figure 10C:
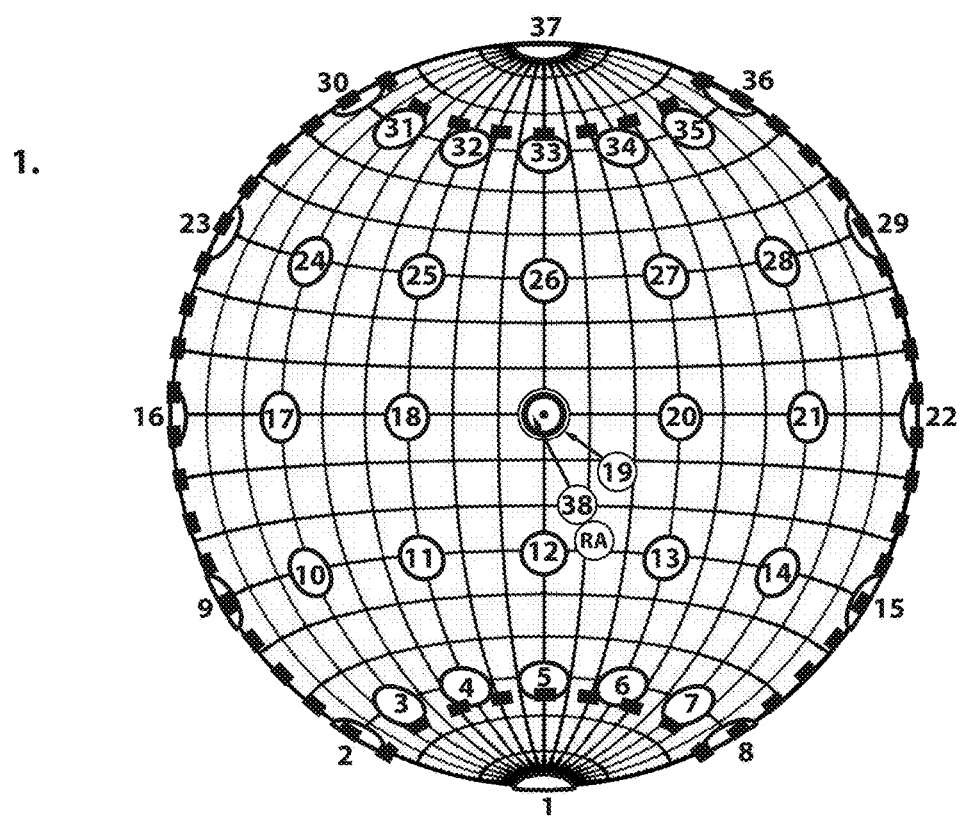
Figure 10C:
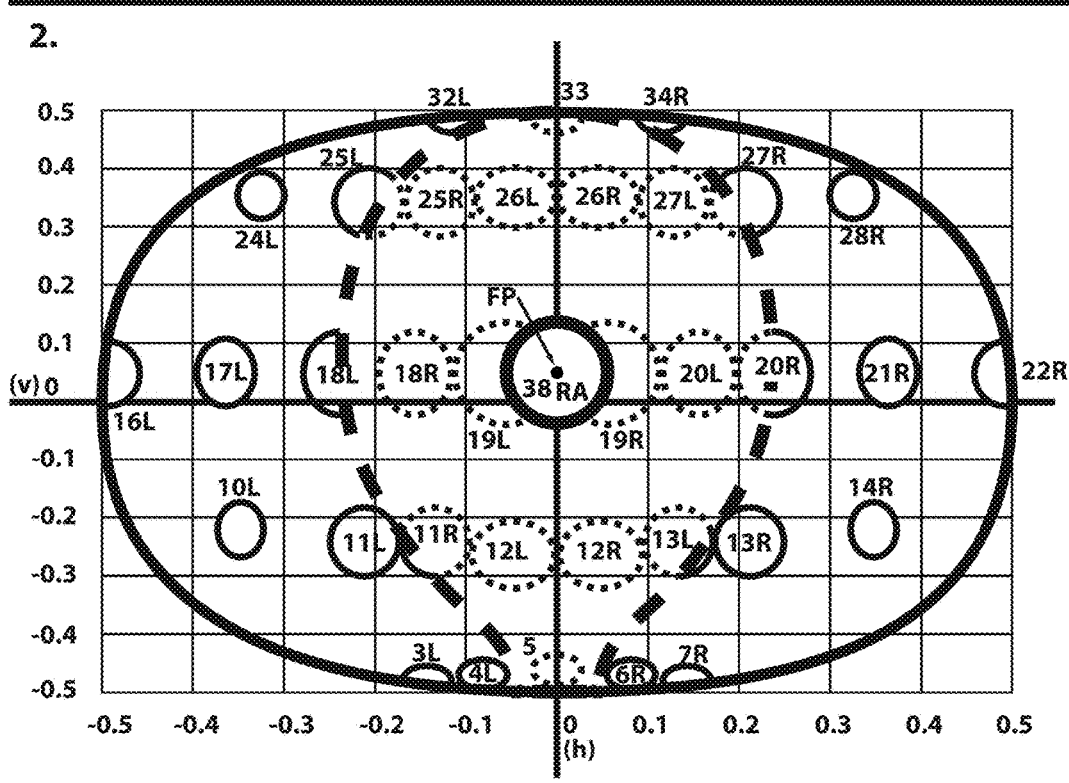
Figure 10D:
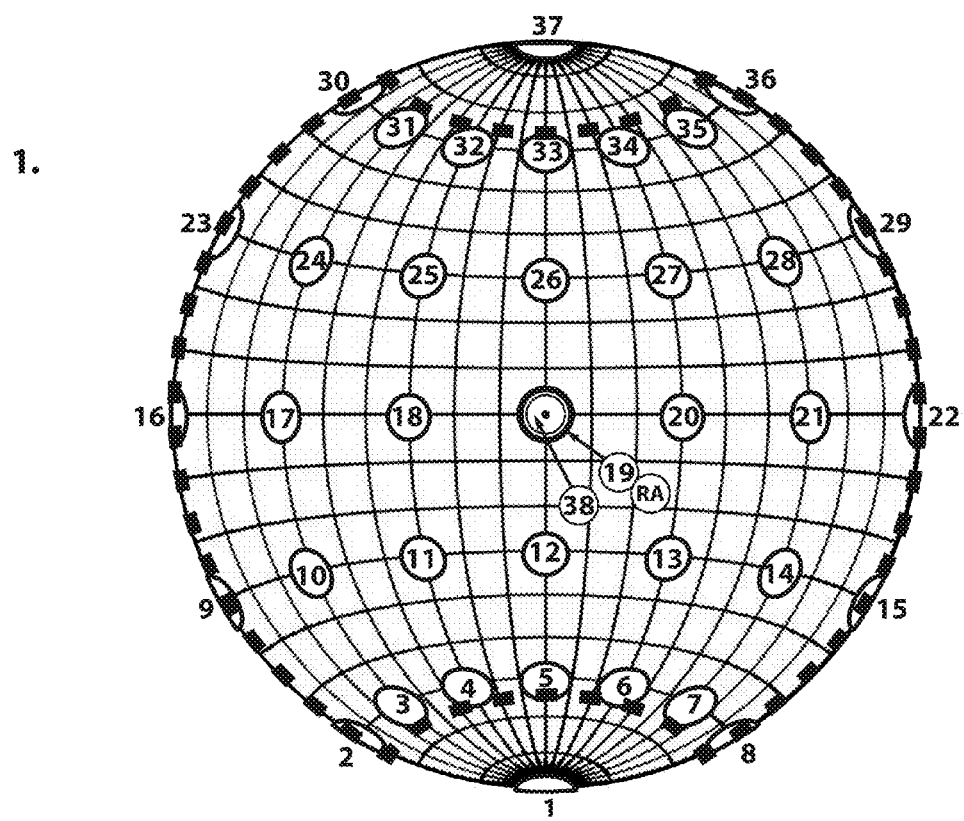
Figure 10D:
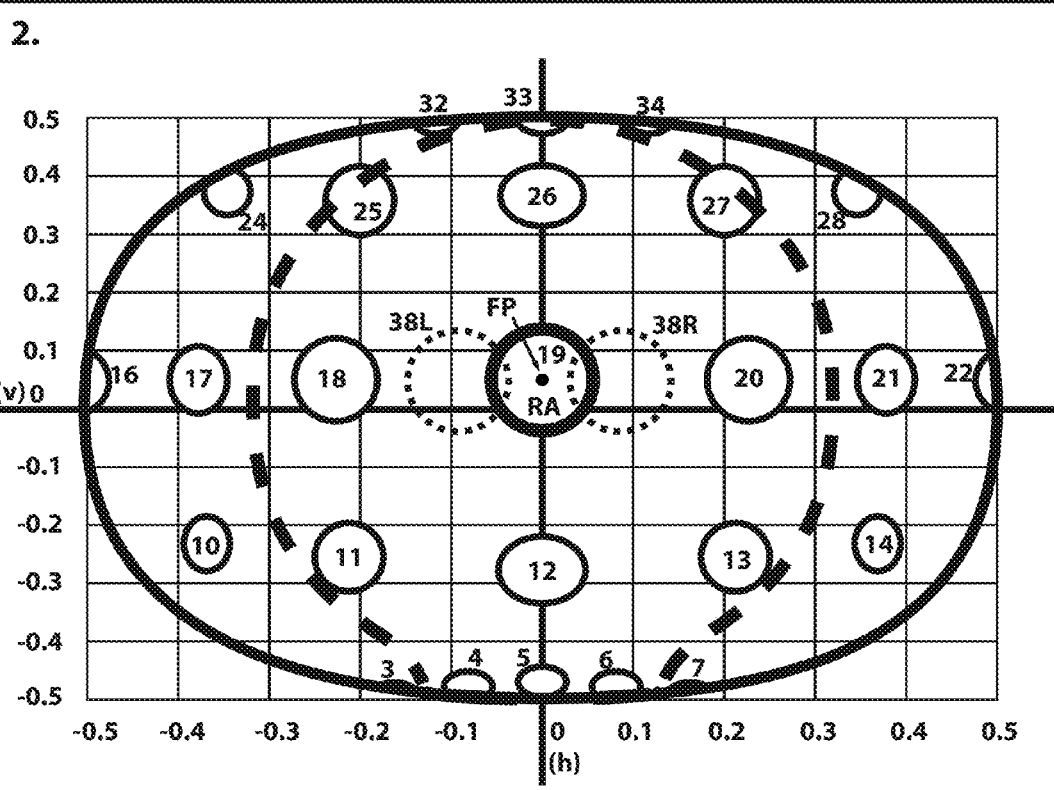

In order to depict relative changes in the scene due to depth, a further step is carried out which uses data about depth in the scene and the disparity between the left and right eyes to represent an image corresponding to what would be seen by a person with normal binocular vision looking at the same scene. Using the depth location of the FP relative to the VP and knowing the location of each eye relative to the scene—information embedded in the FoVD data that is captured at the time the scene is recorded—the data in the FoVM is transformed into the FoVI as illustrated in FIG. 10. FIG. 10a(1) shows the same scene as in FIG. 9 but with an extra disc (numbered 38) located in line with the FP but closer distance to the VP. FIG. 10a(2) shows how the scene viewed in FIG. 10a(1) would be transformed in the field of view image. The dashed lines in FIG. 10a(2) represent the outline of the nose of the viewer that defines the boundaries of the visual field available to each separate eye. The area between the dashed lines represents the part of the visual field that can be seen with two eyes at the same time. In FIG. 10a the FP is on the disc numbered 19, at the rear of the scene, behind disc 38. Consequently, in FIG. 10a(2) disc number 38 appears twice, once for the left eye and once for the right, due to binocular disparity. Note that disc 38 in this case is also semi-transparent. In FIG. 10b the FP is on disc 38, which is closer to VP, and as a consequence areas of the scene behind disc 38 appear doubled, again due to binocular disparity. This doubling, however, occurs mainly in the region of overlap between the two eyes in the central area of the visual field being depicted. Disc 38 now appears solid. Note that the outlying discs in FIG. 10b(2) have moved closer to the centre point than their counterparts in FIG. 10a(2). This represents the 'perceptual zoom' effect that occurs in the background of an image when fixation and attention move in depth. FIGS. 10c and 10d represent the same view and transformation as in FIGS. 10a and 10b but with the position of disc 38 adjusted so that it is closer to the VP, such that the difference between the FP and disc 38 is smaller in FIGS. 10c and 10d than in FIGS. 10a and 10b.

Figure 12A:
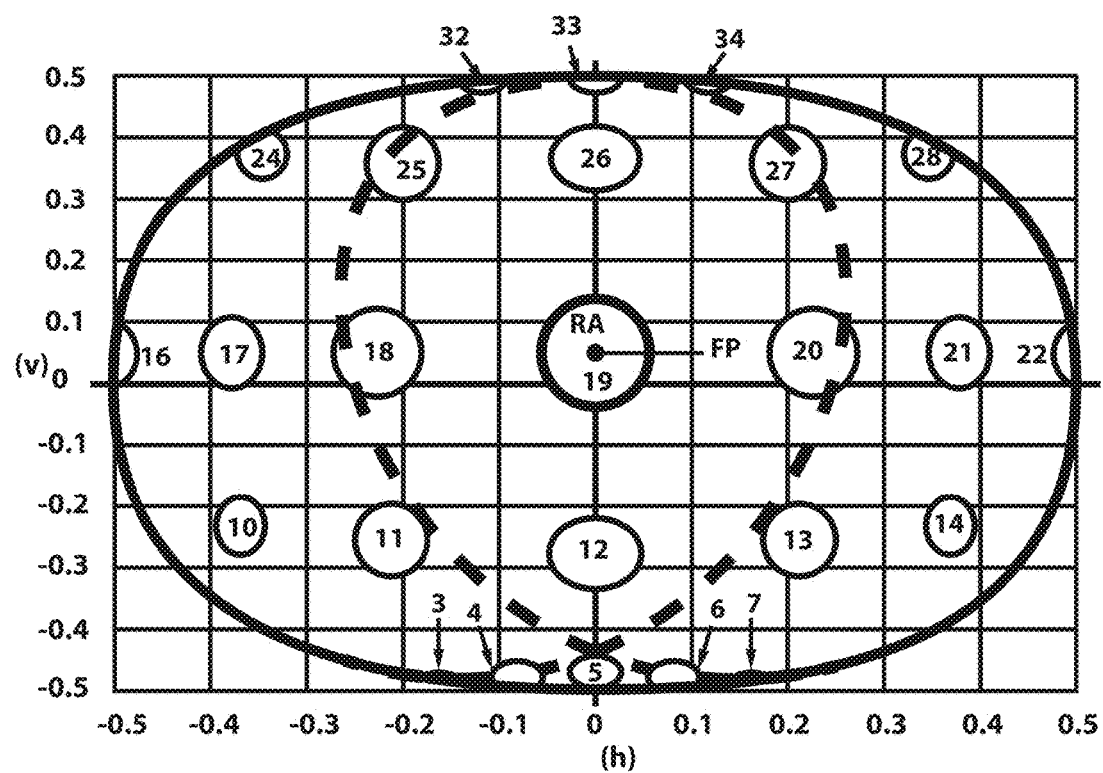
Figure 12B:
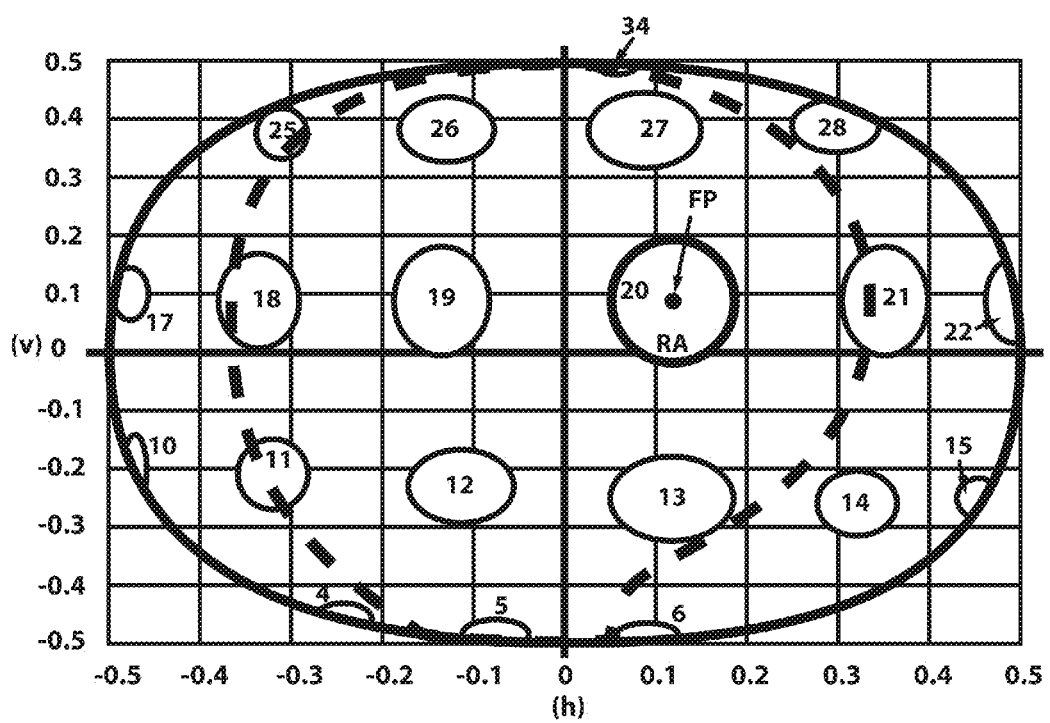

In general, objects or areas within the scene positioned in front of or behind the fixation region in the depth axis are rendered as duplicated and semi-transparent in the FoVI to emulate the effect of physiological diplopia, as occurs in normal human binocular vision. The choice of objects or areas of the scene to be doubled, or the extent of the disparity between the doubled renderings, or their degree of transparency, will depend on the dimensions and position of the area or object to be doubled within the scene and the dimensions and position of the FP relative to VP. Normally the doubled objects or areas will be recorded from 2 points of view, the difference in location being equivalent to the normal inter-ocular gap for a pair of human eyes (FIG. 11). FIG. 11(1) shows the line of sight when the FP relative to the VP is directly ahead. FIG. 11(2) shows the line of sight when the FP relative to the VP is to the right. Consequently the position of the boundary created by the nose for each eye's field of view will change in relation to the total field of view depicted in the FoVI, as illustrated in FIGS. 12a and 12b.

The visual information in the FoVI is rendered such that the area corresponding to the RA has greater resolution, definition and clarity compared to the areas of the image falling outside the RA in the horizontal-vertical axis. The area of the image corresponding to the RA is represented with the highest resolution and clarity, and this decreases progressively as a function of distance from the centre of the fixation region in the horizontal-vertical axis such that the regions at the outer edge of the image are represented with least definition or clarity. Any suitable method of lowering or reducing the resolution, clarity, or definition of the image may be used, such as blurring, scrambling, reduced sampling, or reduced data bandwidth.

The visual information in the FoVI is arranged such that objects located in front of or behind the RA will be rendered in softer focus than the area of the RA, and will become progressively softer in parts of the image further away from the RA in the depth plane.

If the FP is located towards the outer edges of the visual field then the FoVI may include an additional image component that represents the nose (or nasal ridge), eye-brow, or cheek of a human face that would be normally be seen by a human when moving their fixation towards the outer edges of the visual field. Such additional components would obstruct the view of objects lying beyond or behind those facial features, or in the case of the nose seen with both eyes eccentrically the nose would be rendered as semi-transparent. In addition, the FoVI may include representations of other objects situated in close proximity to the human face, such as spectacles, sunglasses, hats, strands of hair, or other objects that would be visible within the full field of view when so placed. Such objects would be rendered in the FoVI with low focal clarity to emulate the fact that objects extremely close to the VP cannot be accommodated in normal vision.

To achieve an enhanced saliency of the fixation region, an effect to the FoVI whereby the image contrast of the fixation region or object is increased compared to the rest of the image by a factor of between 1% and 100%.

To achieve an enhanced saliency of the fixation region, an effect to the FoVI whereby the image brightness of the fixation region or object is increased compared to the rest of the image by a factor of between 1% and 100%.

To achieve an enhanced saliency of the fixation region, an effect to the FoVI whereby the outer edges of the fixation region or object are surrounded by a halo or glow in order to increase the perceived edge contrast between the fixation region or object and the rest of the image.

Colour can be added as an effect to the image whereby the extreme outer edges of the FoVI are reduced in colour saturation and brightness values.

The rendering, outputting or printing the result may be by any suitable means in order to obtain a 2-dimensional image of the 3-dimensional scene being represented. The FoVI may be presented on any suitable imaging medium, such as on a screen, a printed surface, a painted or etched surface, a surface on which the image is projected from a light source, a holographic image, or other suitable medium. In one embodiment the FoVI would be approximately elliptical in shape, but other shapes may be used as necessary to represent the scene. In one embodiment of the invention the FoVI is displayed on a planar screen or surface, such as a monitor, or printed page, or by the projection of light, or holographically, or by other suitable means.

By way of illustration only, FIG. 13 shows a scene captured in conventional linear perspective format and transformed according to the steps described in the present invention.

Figure 14A:
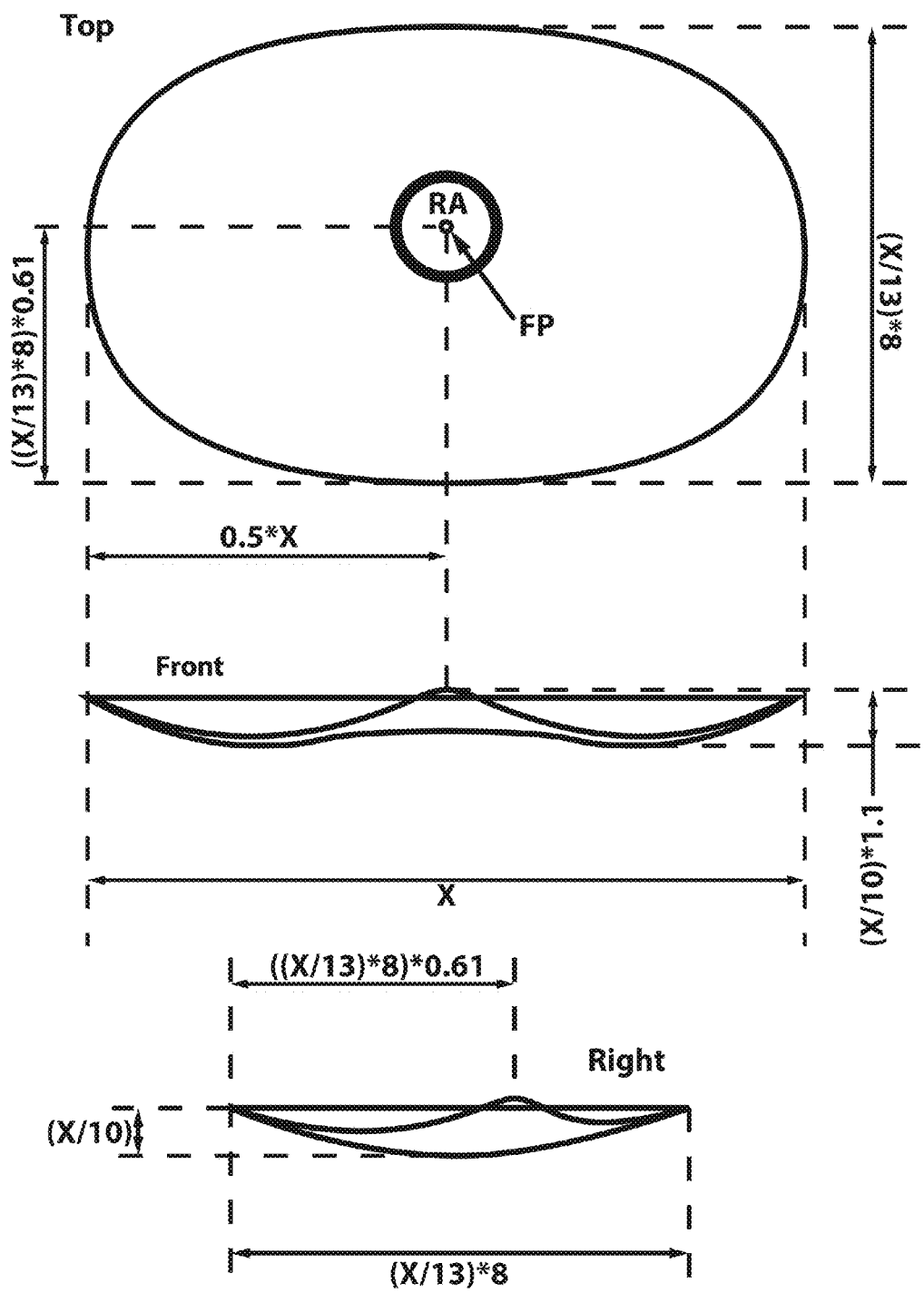
Figure 14B:
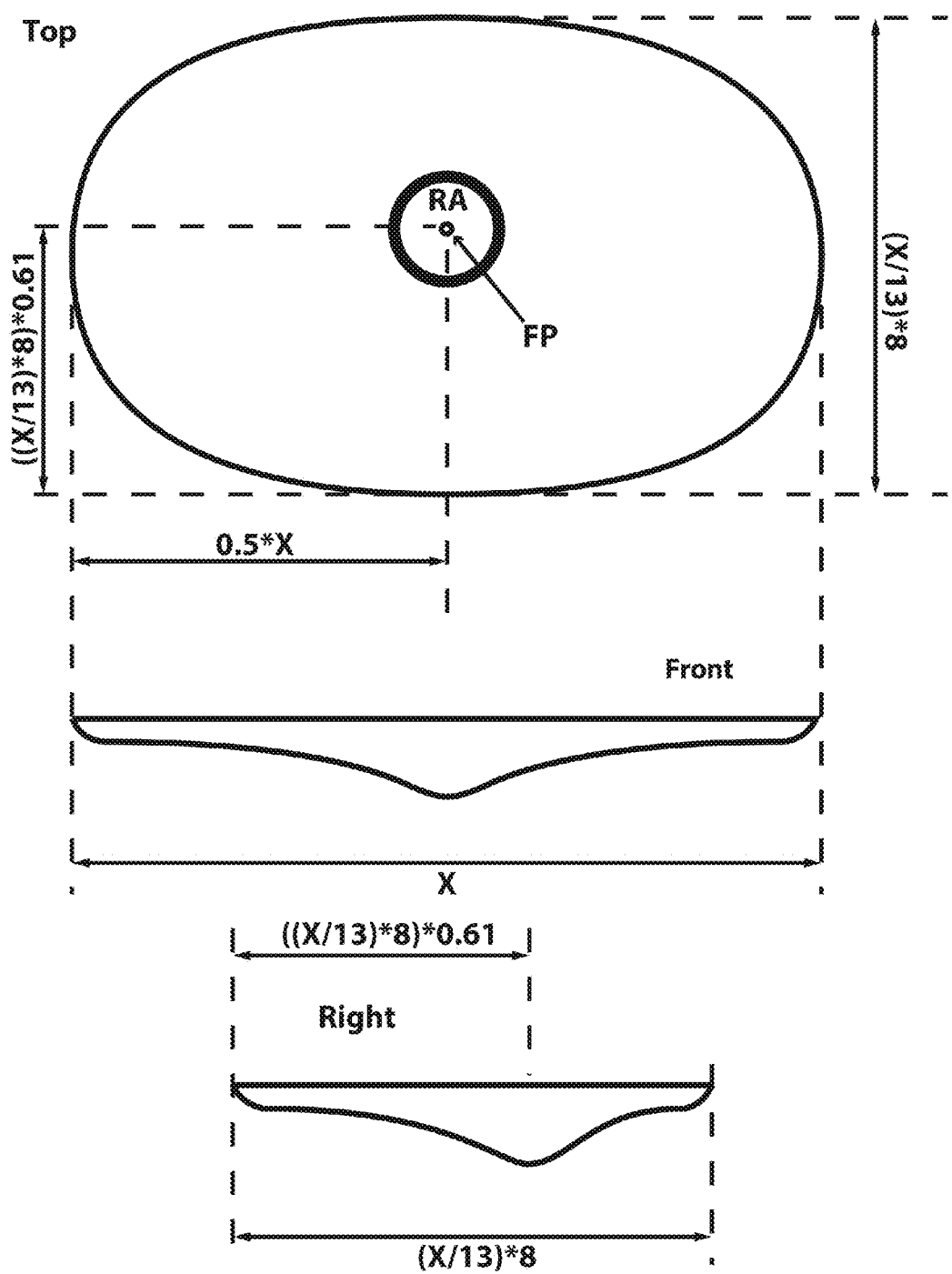
Figure 14C:
Figure 14C:
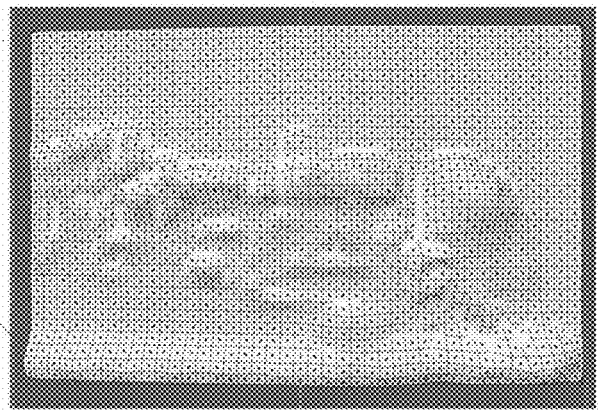
Figure 14C:
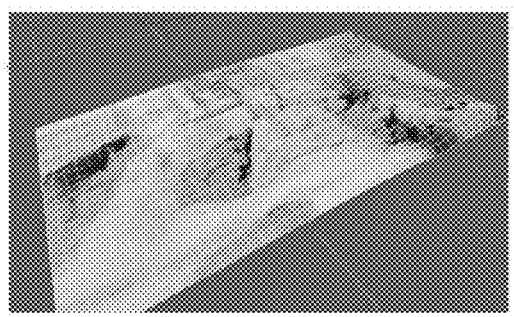
Figure 14C:
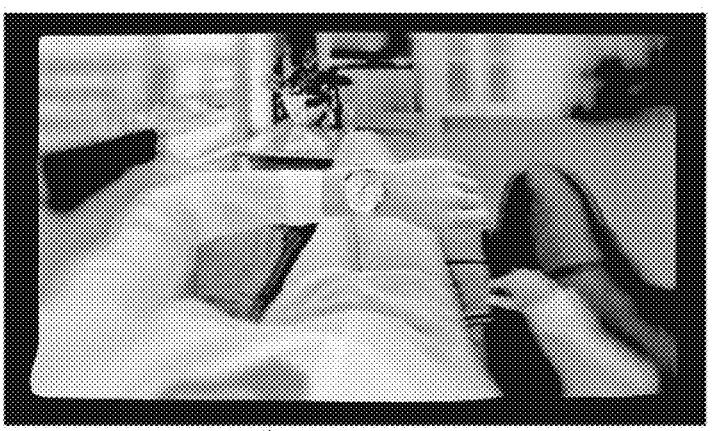

Non-planar screens can also be used to display the FoVIs created by the method described herein, which offer the viewer an enhanced illusion of depth. The display surface may be of any dimension or made of any material suitable to the task of displaying the image. In a further embodiment of the invention the FoVI is displayed on a non-planar surface, such as a screen, a printed surface that is shaped such that the area of the surface corresponding to the RA is protruding or receding relative to the planar surface, so as to form a physical bulge or recession in the surface, and so increase the apparent sense of depth in the FoVI for a viewer suitably positioned in relation to the FoVI. In one embodiment of this invention the shape of the surface on which the image appears as illustrated in FIG. 14a and another as illustrated in 14b. In another embodiment of the invention the non-planar support for the image is formed according to a 3-dimensional depth map generated from the image in which the contours of the non-planar surface map onto the contours depicted in the FoVI when it is printed or projected over the surface (FIG. 14c). In another embodiment of the invention the outer perimeter of the FoVI is gradually darkened, faded, or otherwise modified so that the boundary between the outer edge of the FoVI and the surrounding space is softened, graduated, or concealed. In a further embodiment of the invention the FoVI is displayed behind a suitably fashioned aperture or vignette, set at a variable distance in front of the FoVI, such that the FoVI appears to the viewer partly concealed by the aperture, which increases the illusion of depth. In one embodiment the aperture is approximately elliptical in shape and situated in front of the FoVI as illustrated in FIG. 15.

The invention claimed is:

1. A method of making a 2-dimensional image of a 3-dimensional scene to produce a synthetic emulation of human vision, the method including the steps, in any suitable order, of:

capturing, recording or generating image data representative of a 3-dimensional scene, or otherwise representing the 3-dimensional scene in an entire field of view of the 3-dimensional scene or part thereof, visible to a human observer from a given 'Viewing Point' (VP) when fixating on a given region within the 3-dimensional scene, the 3-dimensional scene including a horizontal axis, a vertical axis, and a depth axis, storing the image data in memory, processing the image data with a processor to progressively compress the region of the 3-dimensional scene corresponding to a peripheral field of vision, relative to a fixation point within the region, to thereby produce modified data representative of a modified 2-dimensional image of the 3-dimensional scene, corresponding to how the 3-dimensional scene would appear to the human observer, wherein the image data is modulated by relative depth of regions within the 3-dimensional scene such that a size of an object within the 3-dimensional scene is adjusted across the depth axis, and storing the modified data in the memory, wherein progressively compressing the region includes an increased compression of the 3-dimensional scene along the horizontal axis, the vertical axis, and the depth axis, away from the fixation point.

2. A method of making an image according to claim 1 in which the output image is displayed on a surface, or through a medium, that increases the perceived sense of depth in the image by using a non-planar support or screen, which takes the form of a bulged and/or indented support or screen, in which the location of the bulge or indentation coincides with the fixation point and region of attention being represented in the image and the outer edge of the image coincides with a boundary of the visual field being represented.

3. A method according to claim 2 in which an aperture or vignette of suitable size, shape, is suitably positioned in front of the planar or non-planar image.

4. A method of making an image of a scene according to claim 1 in which a viewer of the final scene can modify in real time the properties of the image through a suitable input or tracking system, such that the location of the fixation point, the size of the region of attention, the span of the visual field, the degree of clarity, focus, doubling, contrast, the shape of the screen or support and the location of the bulge(s) and/or indentation(s) on the screen or support, and other variables within the image being adjustable in response to changes made by the viewer of the image.

5. A method according to claim 1, wherein capturing, recording, generating, or otherwise representing a scene consisting in the entire field of view is achieved in monoscopic, stereoscopic or cyclopean form.

6. A method according to claim 5, wherein the 3-dimensional scene is in 2-dimensional or 3-dimensional form.

7. A method according to claim 6, wherein the method further comprises the steps in any suitable order of setting co-ordinates, gathering measurements of the scene, and creating a suitable map of the image data to produce the 2-dimensional image.

8. A method according to claim 5 further including defining a boundary of the visual field, locating the fixation point within the image equivalent to where the viewpoint being represented is fixated in the scene, defining the location of the view point relative to the scene, defining the size of region of attention being represented in the scene, providing depth information relevant to the scene, and information about the position of a viewer in relation to the scene, such as angle of view, facial features and other relevant data.

9. A method of creating a map with boundaries equivalent to the dimensions and shape of the field of view being represented, and defining within that map a set of co-ordinates necessary to apply the steps described in accordance with the method of claim 1.

10. A method according to claim 9 including translating, mapping, projecting, or plotting the information recorded from the scene onto a generally 2-dimensional image space.

11. A method according to claim 10 in which the image is approximately elliptical in shape.

12. A method according to claim 11 in which the image is landscape-oriented with an aspect ratio of about 13:8.

13. A display surface for displaying the modified 2-dimensional image of claim 1, the display surface being generally planar but including a bulged or recessed portion corresponding to the fixation point of an intended viewer of the display surface and raised edges corresponding to the peripheral field of vision of a viewer which can be adjusted in response to changes made by the viewer.

14. A display surface according to claim 13 of elliptical form in which the geometry of the ellipse is defined where two circles of diameter x are overlapped so that the width a at the intersection is about 70% of x, two further circles of diameter y, where y is about 26% of x, are inserted in the intersection of the larger circles and overlapped so that the width of their intersection is b, where b is about 35% of y, the ellipse being formed from a line at the boundary of the intersecting circles.

* * * * *